# United States Patent
Sailor et al.

(10) Patent No.: US 7,212,524 B1
(45) Date of Patent: May 1, 2007

(54) MULTICAST CONNECTION SCHEDULING IN TIME:SPACE:TIME SWITCHING FABRICS

(75) Inventors: Kenneth Evert Sailor, Saskatoon (CA); Richard Blake Ryder Wiggs, Richmond (CA)

(73) Assignee: PMC-Sierra, Inc., Santa Clara, CA (US)

( * ) Notice: Subject to any disclaimer, the term of this patent is extended or adjusted under 35 U.S.C. 154(b) by 1042 days.

(21) Appl. No.: 10/323,939

(22) Filed: Dec. 20, 2002

Related U.S. Application Data

(60) Provisional application No. 60/359,701, filed on Feb. 27, 2002.

(51) Int. Cl.
*H04Q 11/06* (2006.01)
(52) U.S. Cl. .................................. 370/370; 370/372
(58) Field of Classification Search ............... 370/369, 370/370, 372, 375, 376
See application file for complete search history.

(56) References Cited

U.S. PATENT DOCUMENTS

| | | | | |
|---|---|---|---|---|
| 6,868,084 | B2* | 3/2005 | Konda | 370/395.1 |
| 2003/0021267 | A1* | 1/2003 | Wu et al. | 370/388 |

OTHER PUBLICATIONS

"Switching and Traffic Theory for Integrated Boradband Networks," Joseph Y. Hui, Kluwer Academic Publishers, Boston, 1990, pp. 53-112.

"Algebraic Switching Theory and Broadband Applications," Shuo-Yen Robert Li, Academic Press, San Diego, 2001, pp. 43-77 & 207-265.

"The Necessary Conditions for Clos-Type Nonblocking Multicast Networks," Yuanyuan Yang and Gerald M. Masson, IEEE Transactions on Computers, 48:11, Nov. 1999, pp. 1214-1227.

"Wide-Sense Nonblocking Networks," Paul Feldman, Joel Friedman, and Nicholas Pippenger, SIAM J. Discrete Math., 1:2, May 1988, pp. 158-173.

* cited by examiner

*Primary Examiner*—Chau Nguyen
*Assistant Examiner*—Marcus Smith
(74) *Attorney, Agent, or Firm*—Oyen Wiggs Green & Mutala LLP

(57) ABSTRACT

Multicast call blocking is reduced in TST switch fabrics with the aid of an m-entry data structure. Each entry corresponds to one of m timeslots, and has 2n sub-entries corresponding to n input ports and n output ports. An N-cast call $X:(y \rightarrow z_1, z_2 \ldots z_N)$ is representable by associating a selected entry's $y^{th}$ input sub-entry with $z_1, z_2, \ldots z_N$ of the selected entry's output sub-entries. Upon receipt of a call, the data structure entries are sequentially examined to detect the first entry for which a $y^{th}$ input sub-entry is unused and $z_1, z_2, \ldots z_N$ output sub-entries are unused. If such an entry is detected, the call is scheduled for transmission in the corresponding timeslot. If there is no such entry and if N=1 the call cannot be scheduled; but, if N>1 the call is divided into two or more calls and an attempt is made to schedule them as above.

27 Claims, 17 Drawing Sheets

FIGURE 8

| CALL | INPUT PORT | INPUT PORT | OUTPUT PORT | OUTPUT PORT | OUTPUT PORT | OUTPUT PORT |
|------|------------|------------|-------------|-------------|-------------|-------------|
| A    | 1          |            | 3           | 4           |             |             |
| B    | 1          |            |             |             | 5           | 6           |
| C    |            | 2          | 3           |             | 5           |             |
| D    |            | 2          |             | 4           |             | 6           |

FIGURE 9

| CALL | IN | IN | IN | OUT | OUT | OUT | OUT | OUT | OUT | OUT | OUT | OUT |
|------|----|----|----|-----|-----|-----|-----|-----|-----|-----|-----|-----|
|      | 1  | 2  | 3  | 4   | 5   | 6   | 7   | 8   | 9   | 10  | 11  | 12  |
| A    | 1  |    |    | 4   | 5   | 6   |     |     |     |     |     |     |
| B    | 1  |    |    |     |     |     | 7   | 8   | 9   |     |     |     |
| C    | 1  |    |    |     |     |     |     |     |     | 10  | 11  | 12  |
| D    |    | 2  |    | 4   | 5   | 6   |     |     |     |     |     |     |
| E    |    | 2  |    |     |     |     | 7   | 8   | 9   |     |     |     |
| F    |    | 2  |    |     |     |     |     |     |     | 10  | 11  | 12  |
| G    |    |    | 3  | 4   | 5   | 6   |     |     |     |     |     |     |
| H    |    |    | 3  |     |     |     | 7   | 8   | 9   |     |     |     |
| I    |    |    | 3  |     |     |     |     |     |     | 10  | 11  | 12  |

| CALL | IN | IN | IN | IN | OUT | OUT | OUT | OUT | OUT | OUT | OUT | OUT | OUT | OUT | OUT | OUT | OUT | OUT | OUT | OUT |
|---|---|---|---|---|---|---|---|---|---|---|---|---|---|---|---|---|---|---|---|---|
| A | 1 | | | | 5 | 6 | 7 | 8 | | | | | | | | | | | | |
| B | 1 | | | | | | | | | | | | | | | | | | | |
| C | 1 | | | | | | | | | | 12 | | | | | | | | | |
| D | 1 | | | | | | | | | 10 | 11 | | | | | 16 | | 18 | | 20 |
| E | | 2 | | | 5 | | | | 9 | | | | 13 | 14 | 15 | | 17 | | 19 | |
| F | | 2 | | | | 6 | | | | | | | | | | | 17 | 18 | | |
| G | | 2 | | | | | 7 | | | 10 | | | 13 | 14 | | | | | 19 | |
| H | | 2 | | | 5 | | | 8 | | | | 12 | | | 15 | 16 | | | | 20 |
| I | | | 3 | | | | | | 9 | | | | | | | 16 | | | | 20 |
| J | | | 3 | | | 6 | | 8 | | | | 12 | 13 | | 15 | | | | | |
| K | | | 3 | | 5 | | 7 | | | | 11 | | | 14 | | | 17 | 18 | 19 | |
| L | | | 3 | | | | | 8 | | | | 12 | 13 | 14 | | | | | | |
| M | | | | 4 | | 6 | | | | 10 | | | | | | | | | 19 | |
| N | | | | 4 | | | 7 | | | | 11 | | | | | 16 | 17 | | | 20 |
| O | | | | 4 | | | | | 9 | | | | | | | | | | | |
| P | | | | 4 | | | | | | | | | | | 15 | | | 18 | | |

FIGURE 10

MULTICAST CONNECTION SCHEDULING IN TIME:SPACE:TIME SWITCHING FABRICS

REFERENCE TO RELATED APPLICATION

This application claims the benefit of U.S. Provisional Patent Application Ser. No. 60/359,701 filed 27 Feb. 2002.

TECHNICAL FIELD

This invention schedules multicast connections through Time:Space:Time (TST) switching fabrics or through TST-equivalent fabrics.

BACKGROUND

TST switching fabrics are commonly used to reduce physical complexity in time division multiplexed (TDM) switching systems. An n-port, m-timeslot TST switching fabric receives a different input signal at each one of the fabric's n ingress ports. Each input signal is time-divided into "timeslots." Each timeslot contains a discrete "grain" portion of the input signal. The switching fabric's input time stage permits arbitrary temporal rearrangement of the input signal by reassigning ingress grains to different timeslots. The temporally rearranged signal then passes through a space stage which permits arbitrary space rearrangement of the input signal by reassigning grains to different ports. An output time stage then permits further arbitrary temporal rearrangement of the space-permuted signal by reassigning egress grains to different timeslots. TST switching fabrics thus permit any signal grain received on any input port in any timeslot to be output on any output port in any timeslot.

For example, FIG. 1A depicts a simple 3 port, 4 timeslot TST switching fabric. In the particular situation depicted in FIG. 1A, input port 1 has received an input signal consisting of grain A assigned to ingress timeslot 1, grain B assigned to ingress timeslot 2, grain C assigned to ingress timeslot 3 and grain D assigned to ingress timeslot 4; and, the input time stage has temporally rearranged the port 1 signal by reassigning grain D to egress timeslot 1 and reassigning grain A to egress timeslot 4. Grains B and C remain assigned to timeslots 2 and 3 respectively.

Input port 2 has received an input signal consisting of grain E assigned to ingress timeslot 1, grain F assigned to ingress timeslot 2, grain G assigned to ingress timeslot 3 and nothing assigned to ingress timeslot 4. The input time stage has temporally rearranged the port 2 signal by reassigning grain G to egress timeslot 1, reassigning grain E to egress timeslot 3 and reassigning grain F to egress timeslot 4. The input time stage has taken advantage of the fact that no grain occupies ingress timeslot 4 by replicating grain G in egress timeslot 2 so that grain G is assigned to two egress timeslots. The input time stage's reassignment of grains to timeslots does not affect the port assignments.

Input port 3 has received an input signal consisting of grain H assigned to ingress timeslot 1, grain I assigned to ingress timeslot 2, and nothing assigned to either of ingress timeslots 3 or 4. The input time stage has temporally rearranged the port 3 signal by reassigning grain H to egress timeslot 4 and reassigning grain I to egress timeslot 3.

In the particular situation depicted in FIG. 1A, the space stage has space-permuted the signal received from the input time stage by reassigning grain D from port 1 to port 3, reassigning grain C from port 1 to port 2, and reassigning grain A from port 1 to port 3. Grain B remains assigned to port 1. The space stage has taken advantage of the fact that no grain occupies port 3's timeslot 2 by replicating grain B in port 2 in timeslot 2 so that grain B is assigned to two ports in timeslot 2. The space stage's reassignment of grains to ports does not affect the timeslot assignments.

With respect to port 2, the space stage has taken advantage of the fact that no grain occupies port 3's egress timeslot 1 by replicating grain G in port 1 in timeslot 1 so that grain G is assigned to two ports in timeslot 1. The space stage has also reassigned grain G in timeslot 2 from port 2 to port 3, reassigned grain E from port 2 to port 1, and reassigned grain F from port 2 to port 1.

With respect to port 3, the space stage has reassigned grain H from port 3 to port 2. Grain I remains assigned to port 2.

The output time stage has then temporally rearranged the port 1 signal by reassigning grain G from ingress timeslot 1 to egress timeslot 4, reassigning grain B from ingress timeslot 2 to egress timeslot 3, reassigning grain E from ingress timeslot 3 to egress timeslot 1, and reassigning grain F from ingress timeslot 4 to egress timeslot 2.

With respect to port 2, the output time stage has temporally reassigned grain G from ingress timeslot 1 to egress timeslot 2, reassigned grain B from ingress timeslot 2 to egress timeslot 1, reassigned grain C from ingress timeslot 3 to egress timeslot 4, and reassigned grain H from ingress timeslot 4 to egress timeslot 3.

With respect to port 3, the output time stage has temporally reassigned grain D from ingress timeslot 1 to egress timeslot 3, reassigned grain G from ingress timeslot 2 to egress timeslot 4, reassigned grain I from ingress timeslot 3 to egress timeslot 2, and reassigned grain A from ingress timeslot 4 to egress timeslot 1.

It can thus be seen that, for the particular situation depicted in FIG. 1A, every signal grain is reassigned for output on a different port and in a different timeslot than that grain's input port and timeslot.

A switching fabric is "non-blocking" if every possible combination of input signals can be mapped successfully from the switch's input ports to the switch's output ports. A switching fabric is "rearrangeably non-blocking" if, regardless of the fabric's current assignment of grains to ports and timeslots, some reassignment (i.e. rearrangement) will enable successful mapping of every possible combination of input signals from the switch's input ports to the switch's output ports. A switch, also known as a crossbar switch, can be made strictly non-blocking—non-blocking with no need for rearrangement—by providing additional hardware elements. For example, if each output grain can receive input from any input grain, then non-blocking non-rearranging switching is possible at the cost of at least $n^2 m^2$ hardware elements, where n is the number of ports and m is the number of timeslots since one crosspoint switch is required for each output port and timeslot multiplied by each input port and timeslot. In contrast, TST switching fabrics require only $n^2 + 2nm^2$ hardware elements to achieve non-blocking performance, a significant hardware savings.

Unlike crossbar switches which are non-rearrangeably non-blocking for multicast, TST switching fabrics are only rearrangeably non-blocking for unicast traffic loads; that is, loads in which no ingress grain is scheduled for output on more than one egress port. TST switching fabrics (without speedup as discussed below) are blocking for arbitrary multicast traffic loads; that is, loads in which at least one ingress grain is scheduled for output on two or more different egress ports, as in the FIG. 1A example where port 1 ingress grain B is scheduled for so-called 2-cast output on ports 1 and 2; and, port 2 ingress grain G is scheduled for so-called 3-cast output on ports 1, 2 and 3. Multicasting can be implemented by means of input port replication, namely by replicating ingress grains in the input time stage and unicasting each such replication through the space stage, as previously explained in the case of grain G. This approach can be non-blocking within the space stage, but requires excess capacity at the ingress port to accept the replicated grains. For example, in the situation depicted in FIG. 1A, grain G could not have been replicated on port 2 by the input time stage if ingress timeslot 4 had contained a grain. Such excess capacity is often unavailable.

Because TST switching fabrics are rearrangeably non-blocking for unicast traffic it is always possible to arrange a schedule for any set of unicast requests in which there will be no space stage scheduling conflicts; that is, no situation in which 2 grains are assigned to the same port in the same timeslot. TST switching fabrics can be made strictly (non-rearrangeably) non-blocking for unicast by introducing a so-called "speedup" feature. This can be done in several ways. One method, illustrated in FIG. 16, is to increase the number of timeslots in the input time stage so that, for example, m timeslots received by the input time stage are presented to the space stage as 2m timeslots, with the 2m timeslots presented by the space stage to the output time stage being reduced by the output time stage to m timeslots for output. The FIG. 16 switching fabric's space stage must run twice as fast as the FIG. 1A switching fabric's space stage to support the FIG. 16 fabric's 2-times speedup relative to the FIG. 1A fabric.

Another speedup technique, illustrated in FIG. 17, is to increase the number of ports, for example by doubling the width of the space stage, with the input time stage presenting each timeslot to the space stage twice to achieve 2m timeslots in the space stage, followed by a corresponding 2:1 reduction of timeslots in the output time stage. The FIG. 17 switching fabric's time stages must manage two independently time-arranged sets of grains for each input and output port to support the FIG. 17 fabric's 2-times speedup relative to the FIG. 1A fabric.

A complete description of a TST switching fabric depends not only on the fabric's number of external ports and external timeslots, but also on the fabric's number of internal ports and timeslots. Any TST switching fabric can be characterized as having n external ports, m external timeslots, $m_1$ input time stage ingress (i.e. internal) timeslots, m, output time stage egress (i.e. internal) timeslots, $m_2$ input time stage egress (i.e. internal) timeslots and $m_2$ output time stage ingress (i.e. internal) timeslots. A fabric's time stage speedup factor, $i_t$, is expressed as a ratio of the number of internal to external time stage timeslots: $i_t=m_2/m$. If a fabric has no time stage speedup, $m_2=m$. In other words, that fabric exhibits unity time stage speedup (i.e. $i_t=1$). FIG. 1A depicts a fabric for which $i_t=1$, since $m_2/m=4/4=1$ for that fabric. The FIG. 16 fabric has 2-times speedup relative to the FIG. 1A fabric; meaning $i_t=2$ for the FIG. 16 fabric, since $m_2/m=8/4=2$ for the FIG. 16 fabric.

A fabric's space stage speedup factor, $i_s$, is expressed as a ratio of the number of internal to external ports: $i_s=p/n$, where p is the number of internal ports. The space stage speedup factor indicates the number of ports, i.e. $i_s$, to which each input timeslot must supply input grains. FIG. 1A depicts a fabric for which $i_s=1$, since $p/n=3/3=1$ for that fabric. The FIG. 17 fabric has 2-times speedup relative to the FIG. 1A fabric; meaning $i_t=2$ for the FIG. 17 fabric, since $p/n=6/3=2$ for the FIG. 17 fabric.

For some applications, $i_t$ and $i_s$ simultaneously have values greater than 1. For some applications, $i_t$, or $i_s$, or both, simultaneously have values less than 1. In any case, a fabric's overall speedup factor, s, is expressed as $s=i_t \cdot i_s$.

A TST switching fabric with 2-times speedup is strictly non-blocking for unicast loads. This can be understood by referring to FIG. 2, which depicts the 2m timeslots of a 2-times sped-up m-timeslot TST switching fabric in a worst case scheduling scenario with one group of m−1 timeslots in use by previous inputs from x and another group of m−1 timeslots in use by previous outputs at y, with no overlap between the two groups of timeslots. The total number of timeslots in use is thus m−1+m−1=2m−2 (i.e. all but 2 of the 2m available timeslots are in use). In other words, with 2-times speedup, even this worst case leaves 2 timeslots free for scheduling the last connection of a 100% load of unicast connection requests, namely a request for unicast connection of input x to output y.

Typically, there is some overlap in the scheduling of inputs and outputs, as shown in FIG. 3, where overlap between the previous scheduling of m−1 timeslots for input x and m−1 timeslots for output y leaves more than 2 timeslots free for scheduling.

Similarly, a TST switching fabric with 3-times speedup is strictly non-blocking for 2-cast loads. This can be understood by referring to FIG. 4, which depicts the 3m timeslots of a 3-times sped-up m-timeslot TST switching fabric in a worst case scheduling scenario with a first group of m−1 timeslots in use by previous inputs from x, a second group of m−1 timeslots in use by previous outputs at y and a third group of m−1 timeslots in use by previous outputs at z, with no overlap between the three groups of timeslots. The total number of timeslots in use is thus m−1+m−1+m−1=3m−3 (i.e. all but 3 of the 3m available timeslots are in use). In other words, with 3-times speedup, even this worst case leaves 3 timeslots free for scheduling the last connection of a 100% load of 2-cast connection requests, namely a request for 2-cast connection of input x to output y and to output z involving m timeslots.

Like unicast situations, 2-cast situations typically involve some overlap in the scheduling of the input and the outputs, leaving more than 3 free timeslots. The goal in multicast connection scheduling is to maximize scheduling efficiency to guarantee enough free timeslots to ensure the ability to schedule any requested multicast-up to the capability of the switching fabric, considering that a TST switching fabric may have inherent multicast limitations.

The unicast and multicast properties of TST switches have been investigated in the literature. The equivalence of various switching architectures is well known. For example, FIG. 1B shows the translation of the TST network of FIG. 1A into a so-called "Clos Network." In this configuration, the initial time stages are translated into 4×4 crosspoint switches; the space stage is translated into 4 3×3 switches, and the final time stage is translated into 3 4×4 crosspoint switches. FIG. 1C shows a similar space:time:space (STS) switch. STS switches are the dual of TST switches, where an initial space stage feeds a second stage of time stages to order data for output after a final space stage. The STS switch can be translated to yield the equivalent Clos Network of FIG. 1D. This reveals that while the FIGS. 1A and 1C switches are similar, they are not the same: the initial space stage can only switch 3 elements per timeslot and this leads to a slightly different translation. This invention is applicable to any similar architecture.

More generally, a 2-cast connection request can be specified as X:(y→z, w) where X is the label of the connection that originates at port y and is received at outputs z and w. Connections are also known as "calls". Call labels are analogous to grains. Thus, in FIG. 1A, each letter-labeled grain represents a different call. The set of inputs and outputs are disjoint. A call must originate at an input port and must terminate at one or more output ports. Typically, switching fabrics are symmetrical and have the same number of inputs as outputs, so both inputs and outputs are specified as numbers in the range of 1 to n where n is the number of ports. Labels are used to disambiguate calls, since two different calls can have the same input and output ports.

Graph theory can be used to reveal the most difficult multicast loads. In a multicast resource graph, each call is represented as a node. An "edge" connects nodes which represent a scheduling conflict in the sense that the calls represented by the connected nodes share at least one resource—an input port or output port, or both. FIG. 5 depicts a multicast resource graph corresponding to the set four connection requests A:(1→3, 4), B:(1→3, 5), C:(2→3, 5), and D:(2→5). The edge connecting nodes A and B is labeled "1, 3," because calls A and B both use input port 1 and they both use output port 3. This represents two scheduling conflicts because an input port can service only one call and an output port can service only one call. The edge connecting nodes A and C reveals another scheduling conflict—the edge is labeled "3" because calls A and C both use output port 3. The edge connecting nodes B and C is labeled "3, 5" because calls B and C conflict in their usage of output port 3 and output port 5. The edge connecting nodes B and D reveals yet another scheduling conflict—the edge is labeled "5" because calls B and D both use output port 5. A still further scheduling conflict is revealed by the edge connecting nodes C and D, which is labeled "2" because calls C and D both use input port 2. No edge connects nodes A and D because calls A and D have no common input ports and no common output ports.

Graph "coloring" is the process of assigning colors to a graph's nodes such that no node is adjacent to another node having the same color. A "minimal" graph coloring uses the fewest colors. The FIG. 5 graph can be minimally 3-colored as shown in FIG. 6. Node A is "colored" by diagonal hatching, node B is "colored" by horizontal and vertical cross-hatching, node C is "colored" by the same diagonal hatching as node A and node D is "colored" by diagonal cross-hatching. The FIG. 5 graph can be 3-colored because calls A and D share no resources and can thus have the same color. Graph coloring can be related to call scheduling. Any calls corresponding to nodes having the same color can be scheduled in the same timeslot since such calls share no resources and thus have no input or output port conflicts.

FIG. 7 depicts a multicast resource graph corresponding to the set four connection requests A:(1→3, 4), B:(1→5, 6), C:(2→3, 5), and D:(2→4, 6). This graph represents a "clique"—a set of nodes in which each node is connected to every other node. A clique can be colored only by assigning a different color to each node. Thus, the FIG. 7 graph can be minimally 4-colored. Since each edge connecting the FIG. 7 nodes bears only one numeric label, it is apparent that each edge represents a scheduling conflict involving only one resource (i.e. an input port or and input port, but not both). Such a clique, which consumes the fewest resources, represents a challenging 2-cast load since it requires the most colors for coloring and hence the most timeslots for scheduling. Examination of the set of four connection requests reveals that each port is referenced exactly twice. Therefore, an equivalent set of non-conflicting calls can be scheduled by replicating each call m/2 times, where m is the number of timeslots, without over-allocating any input or output port. Such replication produces a clique having 2m nodes, since if 4 calls are each copied m/2 times, 2m calls result.

FIG. 8 presents in tabular form the calls represented graphically in FIG. 7. FIG. 8 reveals that every call conflicts with every other call at exactly one port—either input or output. If any one port is changed, then the call for which the port has changed ceases to conflict with at least one other call in the set, leading to a smaller number of colors for graph coloring. No ports can be added to any call to create a greater degree of coloring difficulty, since all calls are already 2-cast. The set is therefore a maximal clique for 2-cast in the sense that it requires the most colors for the fewest number of calls for any set of 2-cast calls. This difficult case can be repeated many times to create a difficult 100% load. Since the clique uses each referenced port twice, the clique can be repeated m/2 times in which case every call will conflict with every other call and require a minimum of 4 m/2 or 2m colors or timeslots for scheduling.

Maximal cliques can also be formed for 3-cast and 4-cast. In the case of 3-cast, each port is referenced 3 times, meaning the clique can be repeated m/3 times. This leads to a set of calls with a minimal coloring of 3m (9 calls with m/3 repetitions for a minimum coloring of 3m). FIG. 9 tabulates a maximal clique for 3-cast consisting of the set of nine connection requests A:(1→4, 5, 6), B:(1→7, 8, 9), C:(1→10, 11, 12), D:(2→4, 7, 10), E:(2→5, 8, 11), F:(2→6, 9, 12), G:(3→4, 8, 12), H:(3→5, 9, 10) and I:(3→6, 7, 11). Every call conflicts with every other call at exactly one port.

In the 4-cast case, each port is referenced 4 times and there are 16 calls which can be repeated m/4 times leading to a minimal coloring of 4m (16 calls with m/4 repetitions for a minimum coloring of 4m). FIG. 10 tabulates the resultant maximal clique, again revealing that every call conflicts with every other call at exactly one port.

It is accordingly apparent that maximal cliques for 2-cast, 3-cast and 4-cast connection schedules involving m timeslots can be formed, as above, with minimal colorings of 2m, 3m, and 4m respectively. However, although a maximal clique establishes the minimum number of colors required to color the corresponding graph, a maximal clique does not establish the maximum number of colors required to color all graphs. For example, as previously explained with reference to FIG. 4, worst case strictly non-blocking 2-cast scheduling with m timeslots leaves 3m−3 timeslots free. This is equivalent to saying that the theoretical maximum coloring of a graph representing 2-cast scheduling with m timeslots is 3m−3. The 3-cast clique's minimal coloring of 3m thus exceeds the theoretical maximum possible coloring for 2-cast. This implies that, regardless of the theoretical possibility that there could be a set of 2-cast call requests which is more difficult to schedule than the set represented by the 2-cast clique, the set represented by the 3-cast clique presents an even greater scheduling challenge. It is accordingly appropriate to adopt a set of call requests represented by a maximal clique of size N+1 as being representative of a worst case scheduling challenge for N-cast. This invention addresses that challenge.

BRIEF DESCRIPTION OF DRAWINGS

FIG. 8 tabulates the FIG. 7 connection requests, revealing that they constitute a maximal clique for 2-cast connections involving m timeslots.

FIG. 9 tabulates a set of nine connection requests constituting a maximal clique for 3-cast connections involving m timeslots.

FIG. 10 tabulates a set of sixteen connection requests constituting a maximal clique for 4-cast connections involving m timeslots.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

A timeslot data structure can be used to represent the current state of scheduling at the space stage of a TST switching fabric. The timeslot data structure is representative of the fabric's connection scheduling state, in that a simple translation of the data structure yields time and space switch settings for the fabric. In a timeslot data structure, no input port can present more than one grain per timeslot, and no output port can receive more than one grain per timeslot.

Figure 11:
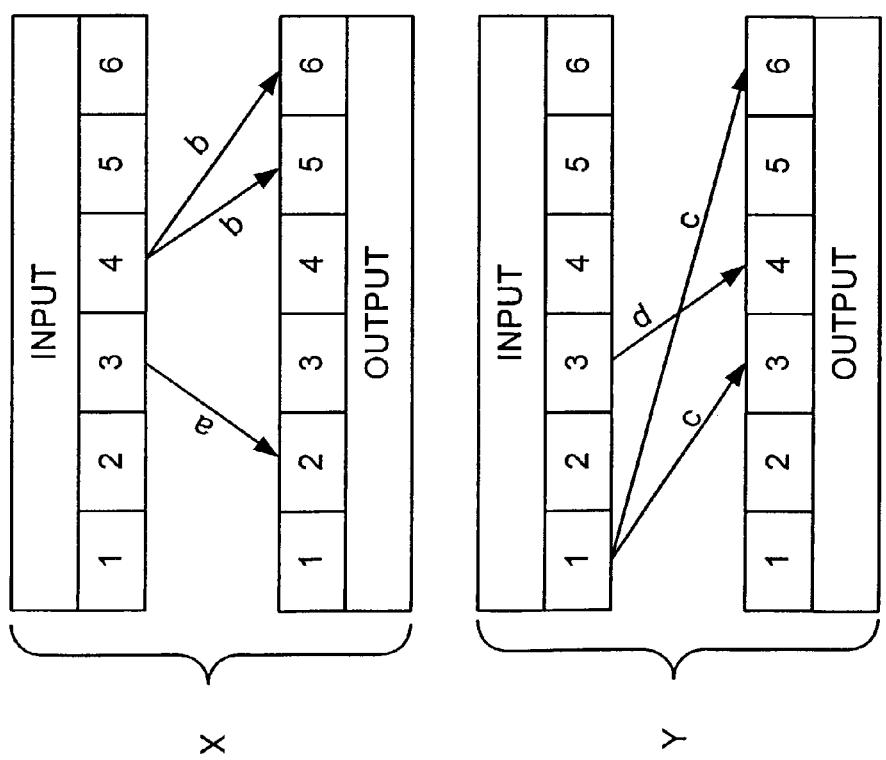
FIG. 11 is a timeslot data structure depicting a connection scheduling state involving calls a:(3→2), b:(4→5, 6), c:(1→3, 6), and d:(3→4) scheduled in two timeslots X, Y on a 6-port space stage.

FIG. 11 diagrammatically depicts a timeslot data structure representative of a connection scheduling state involving timeslots labeled "X" and "Y" for a space stage having 6 input ports and 6 output ports. The arrows connecting inputs to outputs represent calls, with the label on each arrow being the label of the call. Again, call labels are analogous to grains. For example, the arrow from input port 3 to output port 2 is labeled to show that call a has been scheduled in timeslot X. As previously explained, input port 3 is able to present call a in timeslot X due to the switching fabric's input time stage capability to arbitrarily temporally rearrange the input signal by reassigning ingress grains to different timeslots. Similarly, output port 2 is able to receive call a in timeslot X due to the switching fabric's output time stage capability to arbitrarily temporally rearrange the space stage's space-permuted output signal by reassigning egress grains to different timeslots. FIG. 11 represents a timeslot data structure for scheduling calls a:(3→2), b:(4→5, 6), c:(1→3, 6), and d:(3→4) in timeslots X and Y. FIG. 11 also represents the state of the middle stage switches of networks similar to the Clos Network of FIG. 1B; and, by extension, the time stages of the STS network of FIG. 1C.

Figure 12:
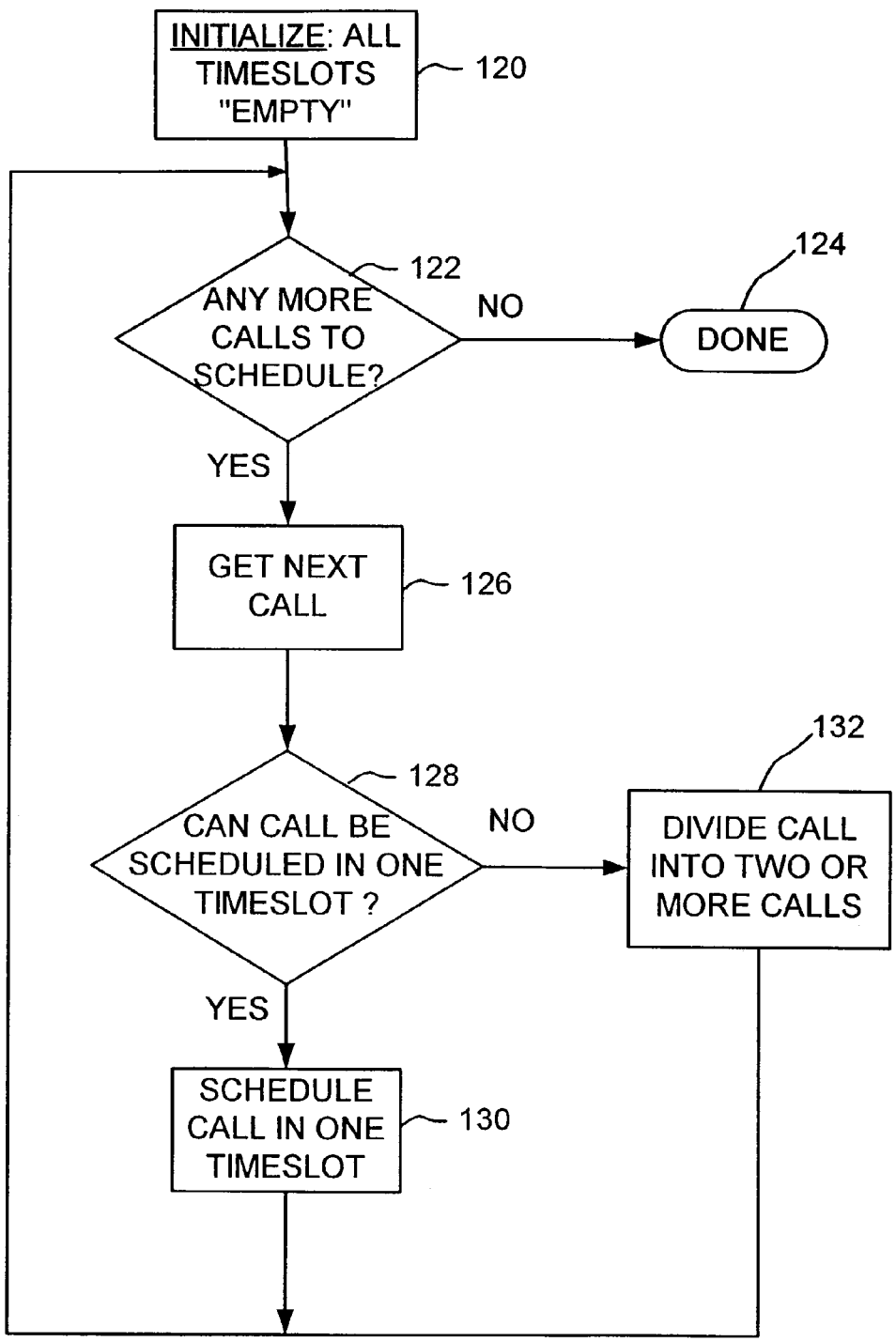
FIG. 12 is a simplified flowchart depiction of the operations performed in scheduling calls in accordance with the invention.

FIG. 12 depicts a simplified version of the sequence of operations performed in scheduling calls in accordance with the invention. A timeslot data structure is formed. Before any calls are scheduled, each available timeslot is assigned an empty (i.e. null or zero) "initialization" value in the data structure (block 120), indicating that all timeslots are initially available to accept calls. A test (block 122) is made to determine whether any calls require scheduling. If the test result is negative (block 122, "No" output) then the operation concludes (block 124). If the test result is positive (block 122, "Yes" output) then next call requiring scheduling is examined (block 126). Another test (block 128) is made by examining the data structure to determine whether that call can be scheduled in any of the available (empty) timeslots. If the block 128 test result is positive (block 128, "Yes" output) then that call is scheduled in one of the available (empty) timeslots (block 130) and the data structure is updated accordingly. If the block 128 test result is negative (block 128, "No" output) and if that call is a multicast call, then that call is divided into two or more calls (block 132), as explained below. After the block 130 or 132 operations are performed, the foregoing operations are repeated, commencing at block 122.

For example, assume that the aforementioned calls a, b, c and d have already been scheduled, resulting in the connection scheduling state shown in FIG. 11 for timeslots X and Y; and, that a further call e:(6→5) is to be scheduled (i.e. the block 122 test result is positive, so the block 126–128 operations are performed to examine call e). If the block 128 operation considers timeslot X before timeslot Y, then timeslot X is rejected as unable to accept call e because, although input port 6 is free in timeslot X, output port 5 is scheduled for call b in timeslot X. As previously explained, no output port can receive more than one grain per timeslot.

Figure 13:
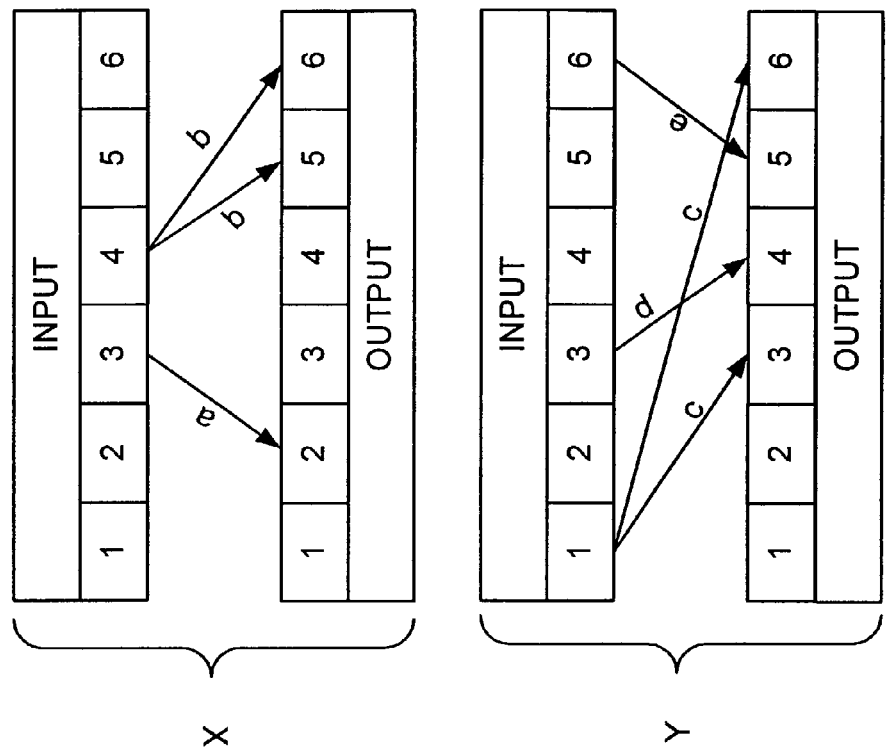
FIG. 13 shows the FIG. 11 connection scheduling state after scheduling of a further call e:(6→5) in timeslot Y.

The block 128 operation then considers timeslot Y, determining that call e can be scheduled in timeslot Y since both input 6 and output 5 are available (i.e. empty) in timeslot Y. Call e is therefore scheduled in timeslot Y (block 130), yielding the updated connection scheduling state shown in FIG. 13.

Now assume that after call e is scheduled as above, another call f:(5→1, 2, 4) must be scheduled. In this case, the block 128 operation rejects timeslot X as unable to accept call f because, although input port 5 is free in timeslot X, output port 2 is scheduled for call a in timeslot X. The block 128 operation also rejects timeslot Y as unable to accept call f because, although input port 5 is also free in timeslot Y, output port 4 is scheduled for call d in timeslot Y. Consequently, the block 128 test result is negative and the block 132 call division operation is performed.

Figure 14:
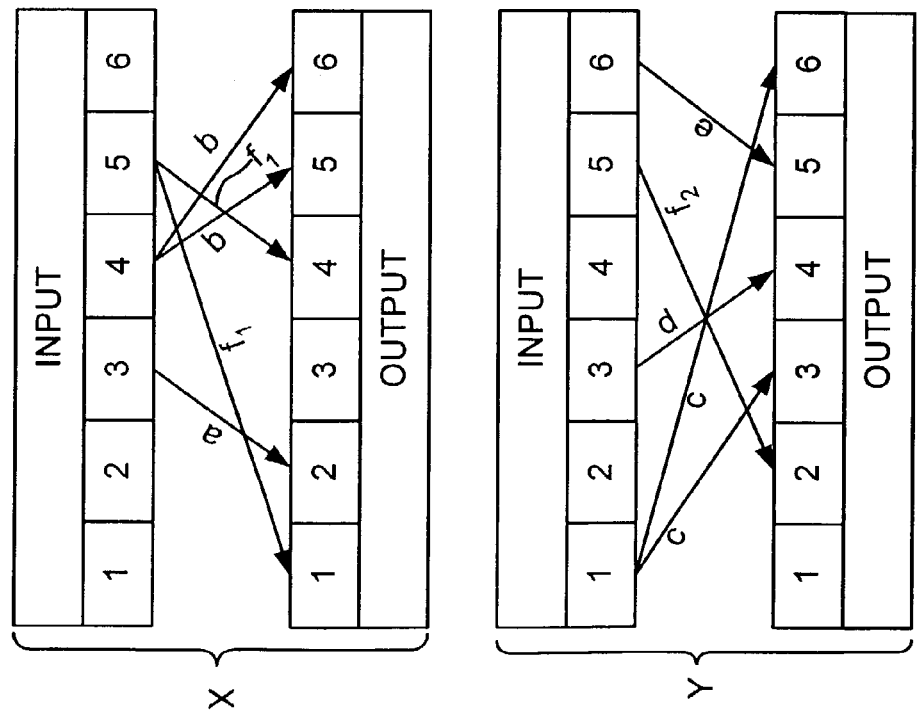
FIG. 14 shows the FIG. 13 connection scheduling state after scheduling of a further call f:(5→1, 2, 4) divided into two calls $f_1$:(5→1, 4) and $f_2$:(5→2) which are scheduled separately.

If the block 132 operation determines, as explained below, that timeslots X and Y are the best available timeslots in the sense that timeslots X and Y have the greatest number of input and output ports available for call scheduling, then call f can be divided into two separate calls $f_1$:(5→1, 4) and $f_2$:(5→2). The FIG. 12 scheduling operation is then repeated. The block 126 operation selects call $f_1$ for examination. The block 128 operation then determines that timeslot X can accept call Of because input port 5 and both of output ports 1 and 4 are free in timeslot X. Call $f_1$ is therefore scheduled in timeslot X (block 130) as shown in FIG. 14. The scheduling operation is then repeated again, with the block 126 operation selecting call $f_2$ for examination. The block 128 operation rejects timeslot X as unable to accept call $f_2$ because input port 5 is no longer free in timeslot X, having been scheduled for call $f_1$ as just explained. The block 128 operation then determines that timeslot Y can accept call $f_2$ because input port 5 and output port 2 are free in timeslot X. Call $f_2$ is therefore scheduled in timeslot Y (block 130) as shown in FIG. 14.

The capability to divide a multicast call into two or more smaller calls requires that the time stages of the TST switching fabric be capable of both duplicating and time-rearranging grains. The capability to divide calls is analogous to the input replication of grain G of FIG. 1A. This replication capability is typical of time stages. For example, in scheduling call f as above, grain duplication is required to divide call f into calls $f_1$, $f_2$; and, time-rearrangement is required to schedule calls $f_1$, $f_2$ in different timeslots X, Y. The grain duplication capability is in turn dependent on the availability of a sufficient number of input timeslots, as in the case of input port replication in servicing multicast call requests.

Given the foregoing simplified overview of the invention, it is now feasible to consider a number of factors affecting performance of the invention in particular circumstances. These factors include the order in which the block 126 operation selects calls for examination by the block 128 operation; the manner in which the block 128 operation determines whether a timeslot is available for scheduling of a call; the manner in which the block 128 and 132 operations divide a call into smaller calls; and, the manner in which speedup ports are represented in the timeslots presented to the space stage. These factors are now discussed.

Figure 3:
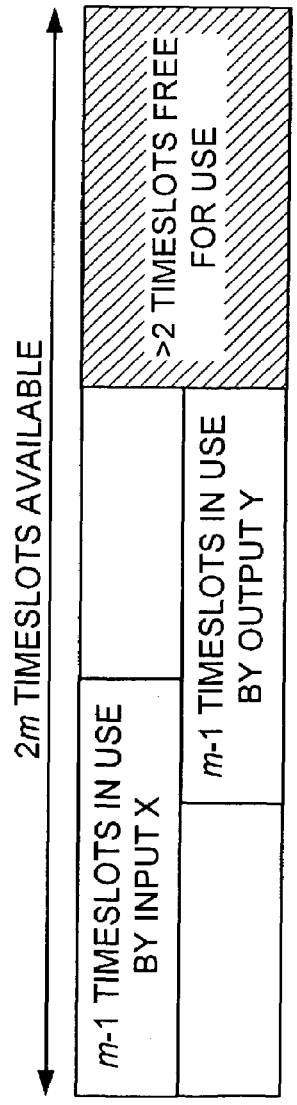
FIG. 3 depicts a non-worst case unicast scheduling scenario involving 2m timeslots, with some overlap between the m−1 timeslots consumed by input x and the m−1 timeslots consumed by output y, leaving more than 2 timeslots free for scheduling.

Before considering the order in which the block 126 operation selects calls for examination by the block 128 operation, it is useful to recall that one cannot predict when a call will terminate. Whenever a call terminates, it is removed from the switch and its representation is removed from the data structure. These randomly timed call deletions can place a TST switching fabric in an undesirable state in which overlapping is minimized, leading to call blocking. Scheduled calls are therefore regularly rearranged (rescheduled) in an effort to pack them more efficiently. As previously indicated with reference to FIG. 3 efficient packing increases overlap, providing more latent capacity for scheduling future call requests. Alternatively, call rearrangement can be delayed until the switching fabric reaches a state in which a particular call cannot be scheduled. This invention is primarily intended for use with TST switching fabrics which service relatively few connection changes, such as a core STS-1 cross connect which generally services large bandwidth call requests for a long duration, in contrast to a voice gateway which must typically handle thousands of call requests per second. Given sufficient speedup, the probability of a call requiring rearrangement of existing calls is exceedingly small. Therefore, given sufficient speedup, the invention can also be applied to voice gateways.

More particularly, the order in which timeslots are considered determines how the timeslots tend to become packed with calls. For example, a search for available timeslots which always starts at the same location and proceeds sequentially from that location tends to maximize the latent capacity of the last timeslots considered, since every other timeslot is considered for scheduling before these last ones. When more challenging loads are scheduled, the capacity of these last timeslots may be used to schedule calls that conflict with calls previously scheduled in the other timeslots. If a call is terminated, it is removed from its scheduled timeslot. If terminated calls are scheduled in earlier timeslots, then these removals return capacity to the switch, but without maximizing latent capacity in the last timeslots. It is advantageous therefore to periodically attempt to reschedule calls from the last timeslots into earlier timeslots. If such a rescheduling succeeds, the switch's latent capacity is increased. Furthermore, if a call must be divided because it cannot be scheduled in a single timeslot, that call requires more resources than if it were scheduled in a single timeslot, since it is duplicated at the input side. It is advantageous to periodically attempt to reschedule divided calls into a single timeslot in order to reclaim the input capacity consumed in dividing the call.

A group of candidate calls (timeslot data structure entries representing previously scheduled calls) can be rearranged (rescheduled) in many different ways. For example, one may maintain a sequentially ordered list of free timeslots (i.e. timeslots having unused call scheduling capacity). The candidate calls are then searched in a predetermined order to detect the first call corresponding to one of the listed free timeslots. If such a call is detected, it is selected for further examination to determine whether its input and output port requirements can also be satisfied. As another example, one may maintain a sequentially ordered list of free timeslots, and sequentially examine the candidate calls to detect the first call corresponding to one of the listed free timeslots by searching the list of free timeslots commencing at the list position immediately following the list position of the timeslot in which the most recently scheduled call was scheduled.

Effective results are obtained if the block 126 operation selects calls for examination in accordance with either one of two call orderings: (1) round robin through input ports, or (2) fully random ordering. Round robin through input ports means that the block 126 operation sorts the list of calls to be added by placing the calls in numerical sequence of their respective input ports. This has the advantage of giving each input port relatively the same opportunity to pass traffic through the space stage. This also eliminates situations in which no traffic is scheduled on a particular input port until all other traffic has been scheduled. In such situations, contention for output ports could cause a large number of calls requiring that particular input port to be divided into smaller calls. Call blocking results if speedup cannot support the resultant requirement for input port replication to service all of the smaller calls. Fully random call ordering means that the call list is randomized before any calls are scheduled. This results in surprisingly good scheduling, often better than that attained by round robin through input ports call ordering. If scheduling time is available, different call orderings can be used to derive a corresponding number of different call schedules, followed by selection and use of the schedule requiring the least call division.

Figure 2:
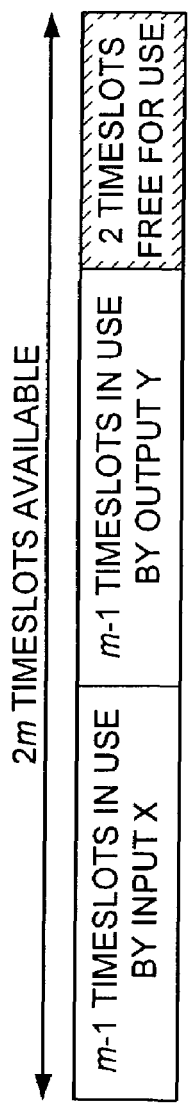
FIG. 2 depicts a worst case unicast scheduling scenario involving 2m non-overlapped timeslots, with m−1 timeslots consumed by input x and m−1 timeslots consumed by output y, leaving 2 timeslots free for scheduling.

Now consider the manner in which the FIG. 12, block 128 operation determines whether a timeslot is available for scheduling of a call. The invention is preferably implemented as a so-called greedy, first fit algorithm. The term "greedy" means that scheduling decisions are made on an approximation basis without reconsidering any decision once it is made. That is, each iteration of the scheduling algorithm is greedy—if two schedules are created and if one of them is selected over the other, then although each schedule is created in a greedy fashion, the selected schedule is not "greedy." The term "first fit" means that as soon as a call schedule which satisfies a call request is determined, that schedule is adopted without regard to possible existence of alternative schedules which might be preferable in some way. A simple in-order linear search through the timeslot data structure has been found to be the most effective. Specifically, the block 128 operation keeps a sequentially ordered list of available timeslots. Each time a call is to be scheduled, the block 128 operation searches that list in the same order, commencing at the same starting point. For example, the list can be searched in numerical sequence, commencing with the first timeslot. Such "first fit" scheduling yields the tightest packing (i.e. maximizes overlap while preserving latent capacity) given all previously scheduled calls, leading to natural overlap (i.e. efficient use of timeslots as previously explained in relation to FIGS. 2 and 3) in the scheduling of inputs and outputs and preserving available bandwidth as much as possible.

Alternatively, instead of commencing the search of the available timeslot list at the same starting point each time a call is to be scheduled, the block 128 operation may commence the search with the timeslot after the timeslot chosen by the immediately preceding search. This tends to spread the scheduled calls across available timeslots, resulting in more even timeslot utilization. Changing the timeslot search technique in this way has the effect of averaging the calls scheduled in each timeslot, since every timeslot is considered once before any timeslot is considered for scheduling of a second call. A schedule which loads each timeslot relatively evenly maximizes every timeslot's latent capacity (average latent capacity) at the expense of heavily loading some timeslots in order to preserve maximum capacity in a few timeslots (absolute latent capacity). Another effective method of preserving average latent capacity is to search the timeslots in random order. Random ordering reduces the impact of any chance interaction between the order in which calls are considered and the order in which timeslots are considered, more effectively distributing the call load evenly between timeslots.

Figure 15A:
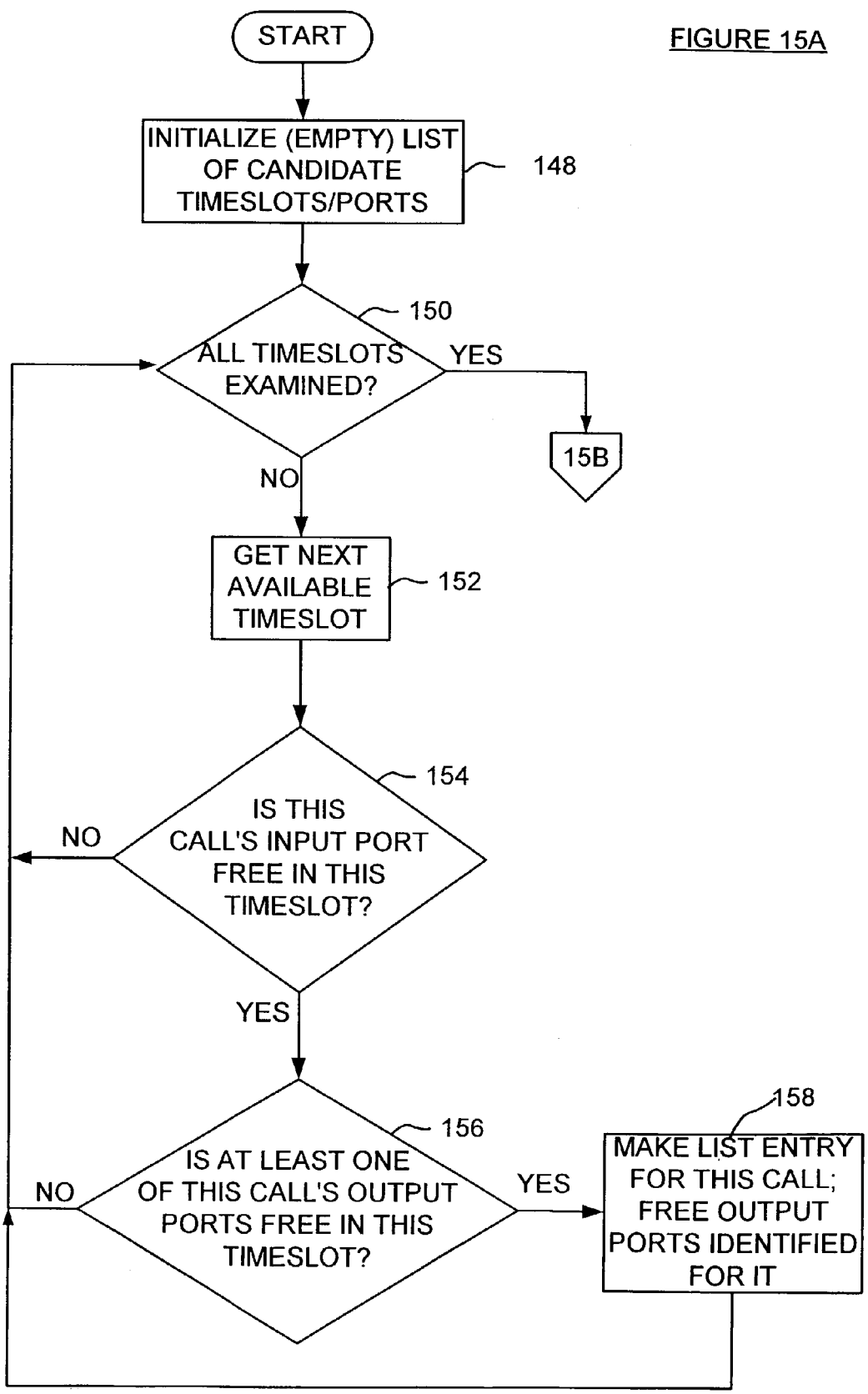
FIGS. 15A and 15B are a flowchart depiction of the operations performed in dividing a call into smaller calls.
Figure 15B:
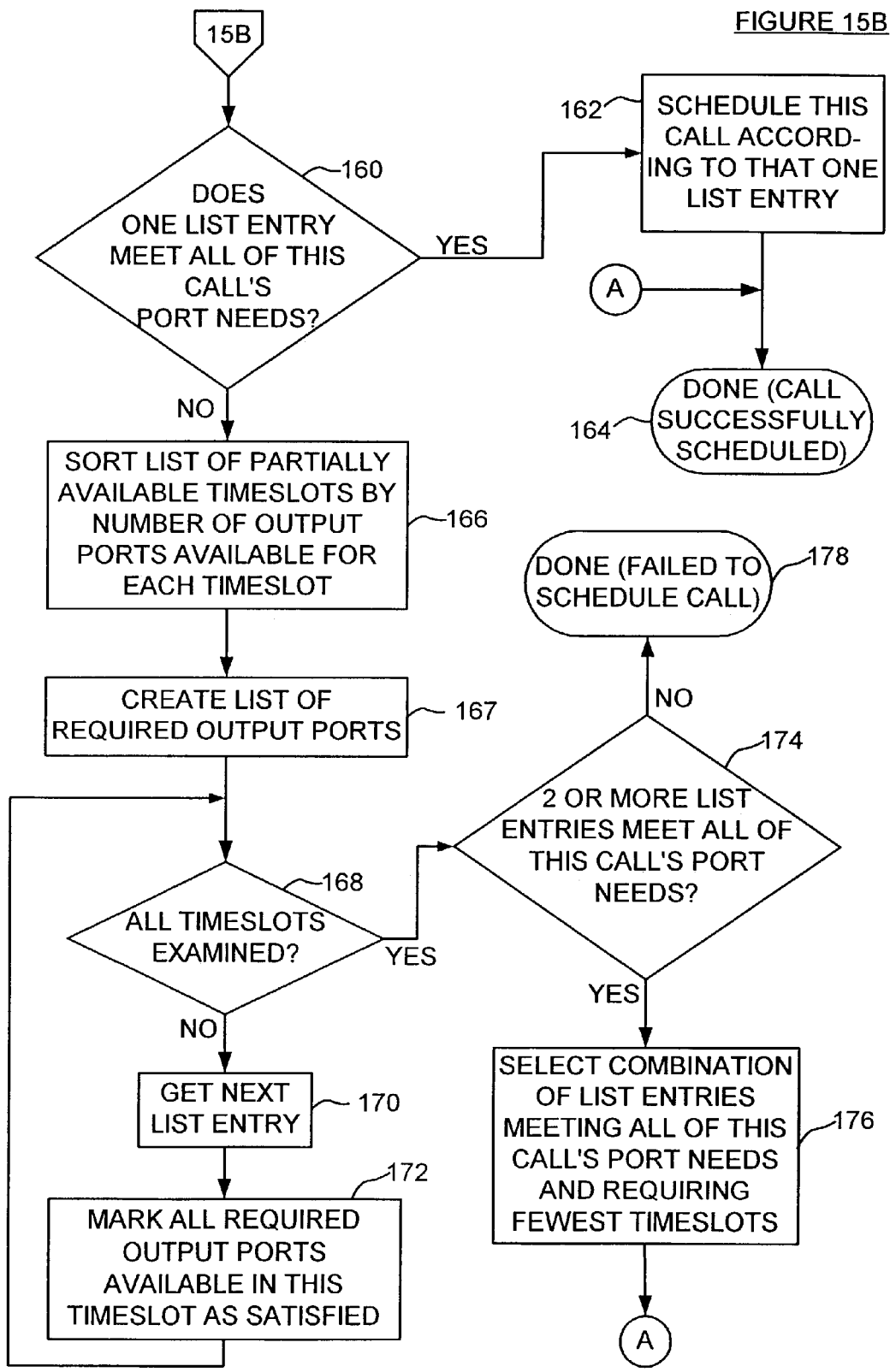

Now consider the manner in which the FIG. 12, block 128 and 132 operations divide a call into smaller calls. FIGS. 15A and 15B illustrate, in flowchart form, one possible sequence for such operations. A list of candidate timeslots with associated available output ports for scheduling the current call is first initialized (block 148) by emptying the list of all candidate entries. A test (block 150) is then made to determine whether any timeslots which are available for scheduling calls remain to be considered as candidates for scheduling the current call (i.e. the call selected by the FIG. 12, block 126 operation). If the test result indicates that more timeslots are available (block 150, "No" output) then the next timeslot to be considered is selected (block 152) in accordance with one of the previously discussed timeslot ordering schemes. A further test (block 154) is then made to determine whether that timeslot has a free input port corresponding to the input port required to schedule the current call. If the block 154 test result is positive (block 154, "Yes" output) then a further test (block 156) is made to determine whether that timeslot has at least one free output port corresponding to one of the output ports required to schedule the current call. If the block 156 test result is positive (block 156, "Yes" output) then an entry is made (block 158) in the previously initialized (block 148) list to record the so-determined timeslot and the available required output ports which are capable of at least partially scheduling the current call. After the block 158 operation, or if either of the block 154 or block 156 test results are negative (block 154, "No" output; or, block 156, "No" output), the foregoing operations are repeated, commencing at block 150.

If the block 150 test result is positive (block 150, "Yes" output) then a further test (FIG. 15B, block 160) is made to determine whether the list made during the block 158 operation(s) contains any one entry which completely satisfies the current call's input and output port scheduling requirements. If the block 160 test result is positive (block 160, "Yes" output) then the current call is scheduled (block 162) in accordance with the timeslot, input port and output port parameters contained in that one list entry. That is, the current call scheduling operation concludes successfully (block 164) and the previously explained FIG. 12 operation continues, commencing at block 122.

If the block 160 test result is negative (block 160, "No" output) then the list made during the block 158 operation(s) is hierarchically sorted (block 166) according to each entry's capability to satisfy the greatest number of the current call's output port scheduling requirements. A list of the output ports required to satisfy this call is then created (block 167). A test (block 168) is then made to determine whether any list entries remain to be considered as candidates for scheduling the current call. If the block 168 test result is negative (block 168, "No" output) then the next hierarchical list entry is selected (block 170) and the cumulative number of the current call's output port scheduling requirements satisfied by the list entries selected thus far is updated (block 172) to reflect the list of output ports needed to satisfy the call. The block 168, 170 and 172 operations are repeated until a number of list entries which, taken together, satisfy all of the current call's output port scheduling requirements have been selected; or, until all of the list entries have been examined.

If the block 168 test result is positive (block 168, "Yes" output) then a further test (block 174) is made to determine whether the block 168, 170 and 172 operations have resulted in selection of two or more list entries which, taken together, satisfy all of the current call's output port scheduling requirements. If the block 174 test result is positive (block 174, "Yes" output) then the current call is scheduled (block 176) in accordance with the timeslot, input port and output port parameters contained in those two or more list entries. That is, the current call scheduling operation concludes successfully (block 164) and the previously explained FIG.

12 operation continues, commencing at block 122. If the block 174 test result is negative (block 174, "No" output) then the current call cannot be scheduled, the scheduling operation concludes unsuccessfully (block 178) and the previously explained FIG. 12 operation continues, commencing at block 122.

Although the FIGS. 15A, 15B operations select the minimum number of timeslots required to schedule the current call (assuming sufficient timeslots and ports are available to schedule the call), the required processing time is proportional to the square of the number of available timeslots, since every timeslot may have at least one port free for the call and each timeslot may be considered in conjunction with every other to find the optimal schedule. An alternative is to perform the block 168, 170 and 172 operations without performing the block 166 hierarchical sorting operation. This also results in selection of two or more list entries which, taken together, satisfy all of the current call's output port scheduling requirements, but does not select the minimum number of timeslots required to schedule the current call. However, the required processing time is only linearly related proportional to the number of timeslots, a significant optimization.

Figure 16:
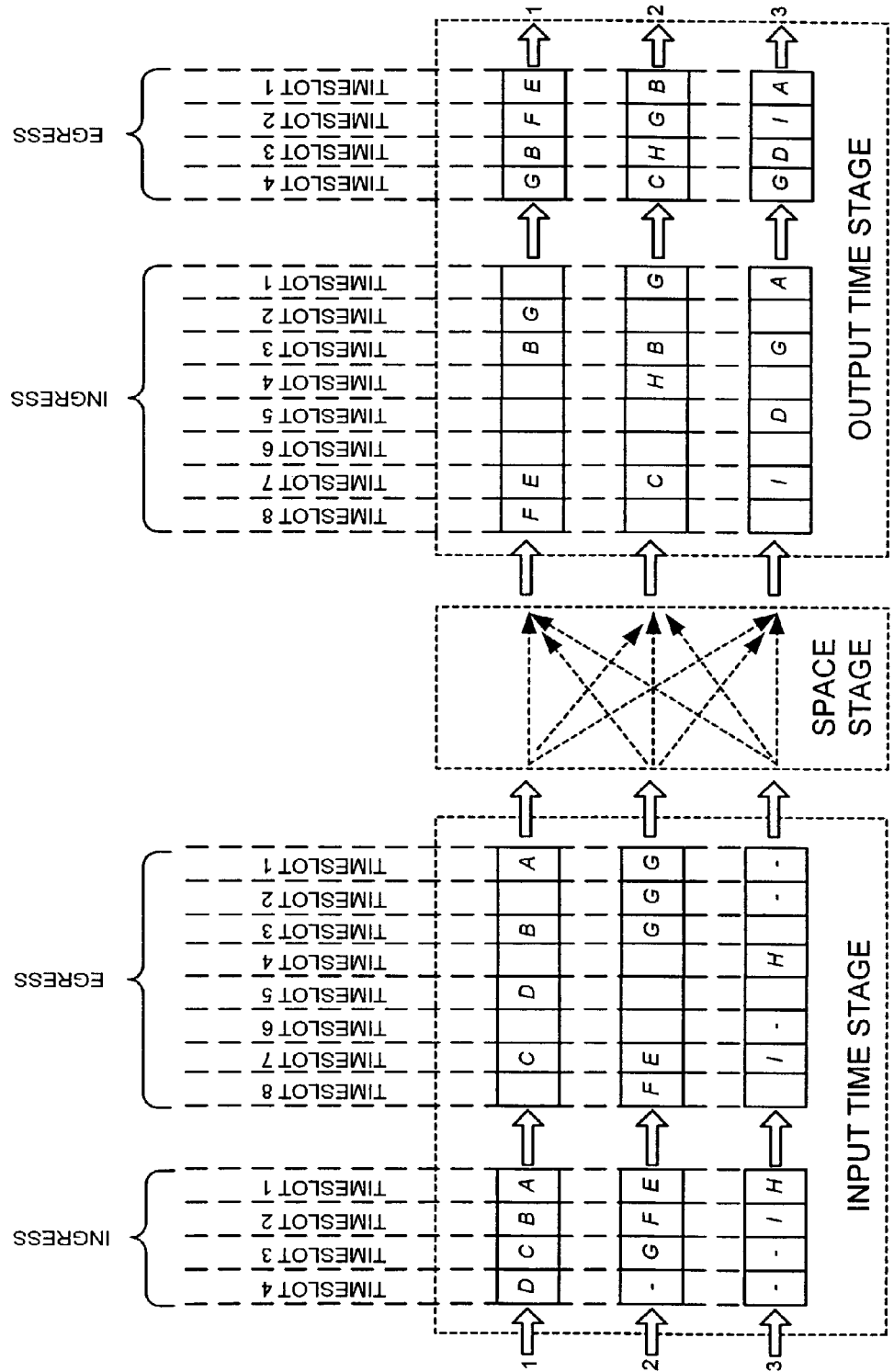
FIG. 16 schematically depicts 2-times speedup of the FIG. 1A switching fabric by doubling the number of timeslots in the input and output time stages.

As previously mentioned, speedup is often used to increase the capability of a TST switch. One common speedup technique is to increase the number of timeslots in the input time stage so that, for example, m timeslots received by the input time stage are presented to the space stage as 2m timeslots, with the 2m timeslots presented by the space stage to the output time stage being reduced by the output time stage to m timeslots for output. FIG. 16 shows this technique applied to the FIG. 1A switching fabric. At the input time stage, the four ingress timeslots received at each port are rearranged and duplicated into eight egress timeslots for presentation to the space stage. At the output time stage, the eight received ingress timeslots are rearranged into four egress timeslots for output. The FIG. 16 switch's internal clock must run at twice the external data rate to avoid loss of data. The speedup ratio (i.e. 2:1 in the FIG. 16 example) is determined by the number of timeslots to be presented to or received from the space stage. If six timeslots were used internally rather than eight, then the speedup ratio would be 1.5:1 and the internal clock would have to run at 1.5 times the external data rate. To model the extra capability provided by this sort of speedup, the number of timeslot data structures is increased to match the speedup.

Figure 17:
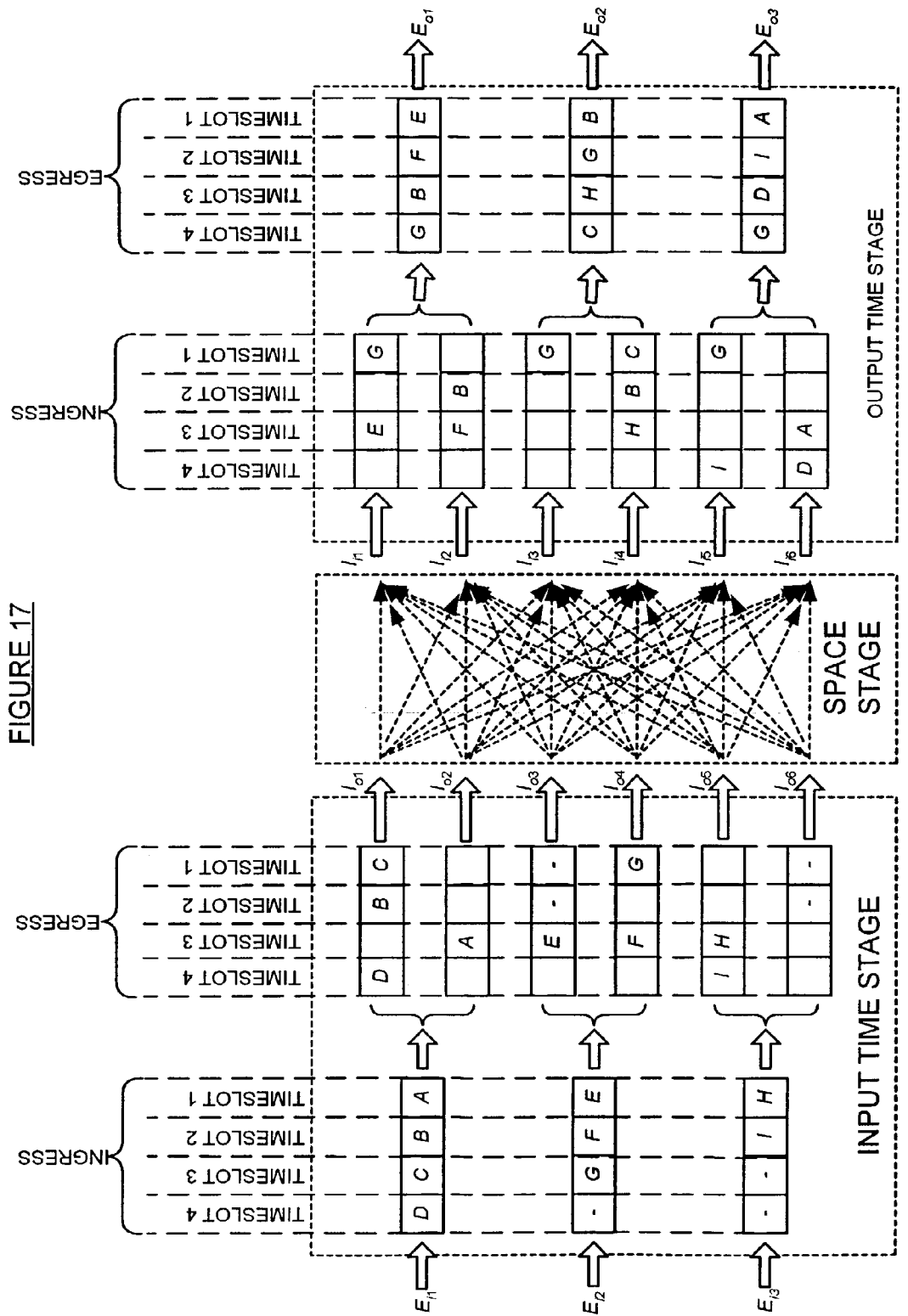
FIG. 17 schematically depicts 2-times speedup of the FIG. 1A switching fabric by doubling the number of ports in the space stage.

Another common speedup technique is to increase the number of ports, for example, by doubling the width of the space stage with the input time stage presenting each timeslot to the space stage twice to achieve 2n ports in the space stage, followed by a corresponding 2:1 reduction of ports in the output time stage. FIG. 17 shows this technique applied to the FIG. 1A switching fabric, yielding 6×6 switch, as opposed to the FIG. 1A 3×3 switch. At the input time stage, the four ingress timeslots are rearranged into four egress timeslots, but each one of the input time stage's external ports feeds two of the internal ports coupling the input time stage to the input side of the space stage. Similarly, at the output time stage, two internal ports coupling the output side of the space stage to the output time stage each feed one of the output time stage's external ports.

Figure 18:
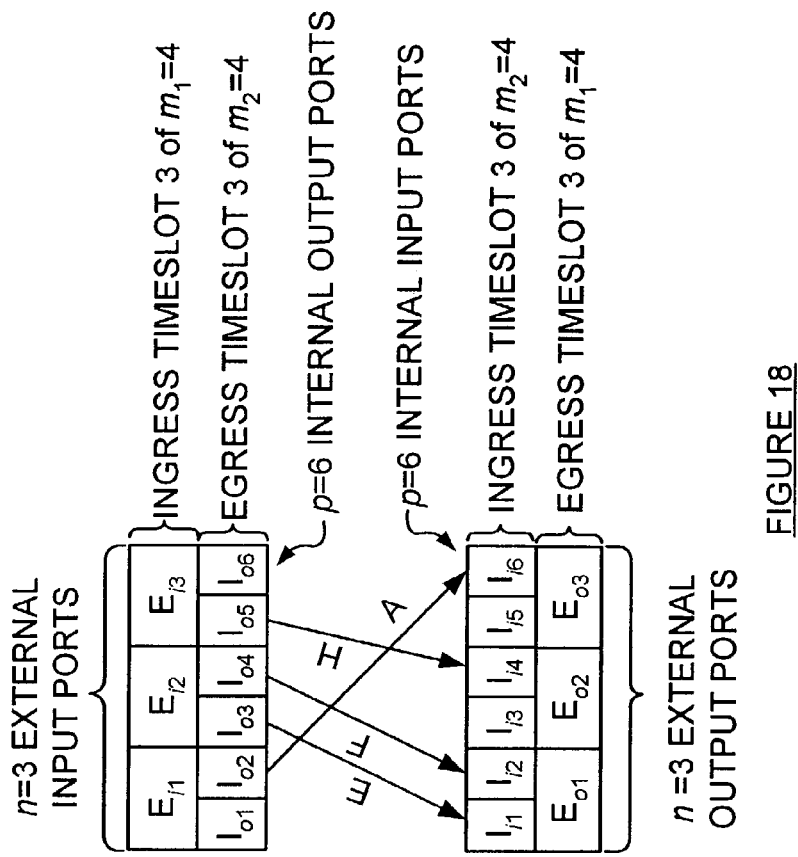
FIG. 18 is a timeslot data structure entry depicting the connection scheduling state of timeslot 3 of the FIG. 17 fabric.

FIG. 18 depicts one timeslot data structure entry representative of the connection scheduling state of the FIG. 17 fabric's timeslot 3. The FIG. 17 fabric has n=3 external input ports $E_{i1}, E_{i2}, E_{i3}$ coupled to the ingress side of the input time stage, p=6 internal output ports $I_{o1}, I_{o2}, I_{o3}, I_{o4}, I_{o5}, I_{o6}$ coupling the egress side of the input time stage to the ingress side of the space stage, p=6 internal input ports $I_{i1}, I_{i2}, I_{i3}, I_{i4}, I_{i5}, I_{i6}$ coupling the egress side of the space stage to the ingress side of the output time stage, and n=3 external output ports $E_{o1}, E_{o2}, E_{o3}$ coupled to the egress side of the output time stage. More particularly, on the input side, external input port $E_{i1}$ is coupled to both of internal output ports $I_{o1}$ and $I_{o2}$ thus enabling port $E_{i1}$ to pass calls to either one or both of ports $I_{o1}$ and $I_{o2}$. External input port $E_{i2}$ is coupled to both of internal output ports $I_{o3}$ and $I_{o4}$, enabling port $E_{i2}$ to pass calls to either one or both of ports $I_{o3}$ and $I_{o4}$, etc. On the output side, both of internal input ports $I_{i1}$ and $I_{i2}$ are coupled to external output port $E_{o1}$, enabling either one or both of ports $I_{i1}$ and $I_{i2}$ to pass calls to port $E_{o1}$. Both of internal input ports $I_{i3}$ and $I_{i4}$ are coupled to external output port $E_{o2}$, enabling either one or both of ports $I_{i3}$ and $I_{i4}$ to pass calls to port $E_{o2}$, etc.

In FIG. 18, the arrow connecting internal output port $I_{o2}$ to internal input port $I_{i6}$ is labeled "A" to indicate that call A (which the input time stage has temporally internally rescheduled from ingress timeslot 1 into egress timeslot 3) is routed internally to pass from external input port $E_{i1}$ through the input time stage and into the space stage via internal output port $I_{o2}$; then pass through the space stage from port $I_{o2}$ to internal input port $I_{i6}$, then pass through the output time stage (which temporally internally reschedules the call from ingress timeslot 3 into egress timeslot 1) from port $I_{i6}$ to external output port $E_{o3}$. External input port $E_{i1}$ is also able to pass calls to internal output port $I_{o1}$, but FIG. 18 shows no such call, reflecting unused scheduling capacity.

The FIG. 18 timeslot data structure entry can be described as representing such capacity in various ways. For example, a counter having a maximum value equal to the number of internal output ports can be associated with each external input port to represent the maximum number of calls that can be handled by each external input port. The FIG. 18 timeslot data structure entry requires 6 counters, each having a predefined maximum value=2. One counter corresponds to each one of external input ports $E_{i1}, E_{i2}, E_{i3}$ and one counter corresponds to each one of external output ports $E_{o1}, E_{o2}, E_{o3}$. Before any calls are scheduled, all of the counters are initialized, for example by storing the value zero in each counter. If a port's counter value is less than the maximum value, then an incoming call can be scheduled on that port, and the counter incremented accordingly. When a call is dropped from a port, the counter associated with that port is decremented. Thus, the counter corresponding to external input port $E_{i1}$ depicted in FIG. 18 currently has a value=1, representing the fact that one call is currently scheduled (in timeslot 3) on external input port $E_{i1}$. The fact that the counter's value is one less than the maximum value=2 indicates that the fabric currently has the capacity to schedule one more call on external input port $E_{i1}$ (i.e. via internal output port $I_{o1}$, which is free as indicated by the absence of a call label arrow initiating at that port). By contrast, the counter corresponding to external input port $E_{i2}$ currently has a value=2, representing the fact that 2 calls are currently scheduled (in timeslot 3) on external input port $E_{i2}$. The fact that the counter's value is equal to the maximum value=2 indicates that the fabric currently has no capacity to schedule another call on external input port $E_{i2}$.

Alternatively, and equivalently, the FIG. 18 timeslot data structure entry can be described as containing 2n sub-entries. The first n sub-entries correspond to the n external input ports. The second n sub-entries correspond to the n external output ports. Each sub-entry has $i_s=p/n$ sub-sub-entries. Each sub-sub-entry can be a binary digit having the value "0" to indicate that no call is scheduled on the corresponding internal port, or the value "1" to indicate scheduling of a call on that port. Thus, a timeslot data structure corresponding to the FIG. 17 fabric requires $m_1=m_2=4$ entries-one for each of the 4 ingress/egress timeslots. Each entry requires $2n=6$ sub-entries—each one of the first 3 sub-entries corresponding to one of the external input ports $E_{i1}$, $E_{i2}$, $E_{i3}$ and each one of the second 3 sub-entries corresponding to one of the external output ports $E_{o1}$, $E_{o2}$, $E_{o3}$. Each sub-entry requires $i_s=p/n=6/3=2$ sub-sub-entries—one for each one of the internal ports associated with the external port of the corresponding sub-entry. Thus, a sub-entry corresponding to input port $E_{i1}$ requires 2 sub-sub-entries—one corresponding to internal output port $I_{o1}$ and another one corresponding to internal output port $I_{o2}$.

Figure 19:
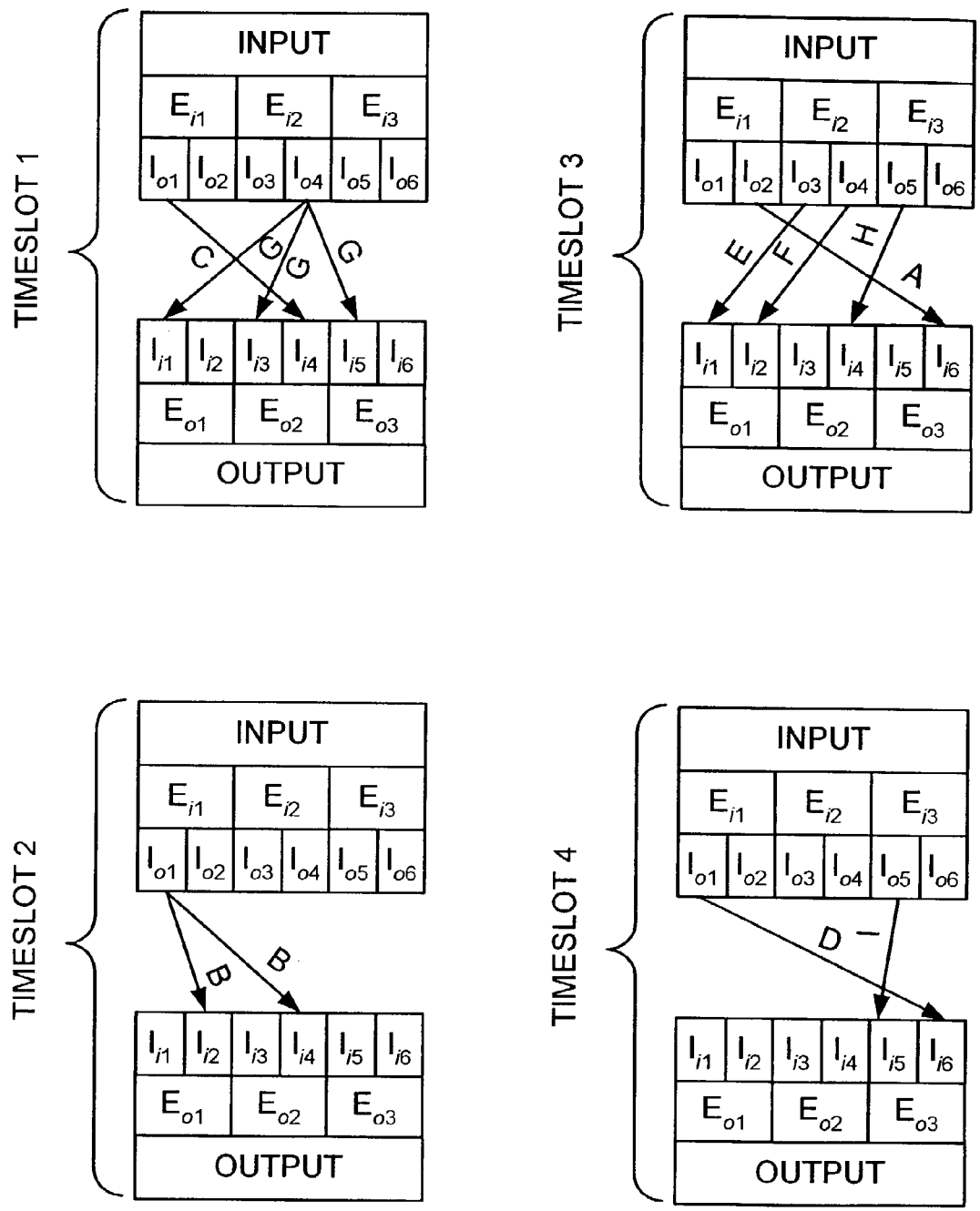
FIG. 19 is a timeslot data structure depicting the connection scheduling state of each timeslot of the FIG. 17 fabric.

FIG. 19 depicts a complete timeslot data structure corresponding to the FIG. 17 fabric. The FIG. 19 timeslot data structure has $m_1=m_2=4$ entries—one for each of the 4 egress/ingress internal timeslots. Each entry requires $2n=6$ counters (or sub-entries). Each counter (or sub-entry) corresponds to one of the external input ports $E_{i1}$, $E_{i2}$, $E_{i3}$ or to one of the external output ports $E_{o1}$, $E_{o2}$, $E_{o3}$. Each counter has a maximum value corresponding to the fabric's space stage speedup factor $i_s=p/n=6/3=2$ (or each sub-entry has $i_s$ sub-sub-entries). Such a timeslot data structure represents the FIG. 17 fabric's capacity to schedule $n\cdot m=3\cdot 4=12$ unicast calls between external input ports $E_{i1}$, $E_{i2}$, $E_{i3}$ and external output ports $E_{o1}$, $E_{o2}$, $E_{o3}$.

Figure 20:
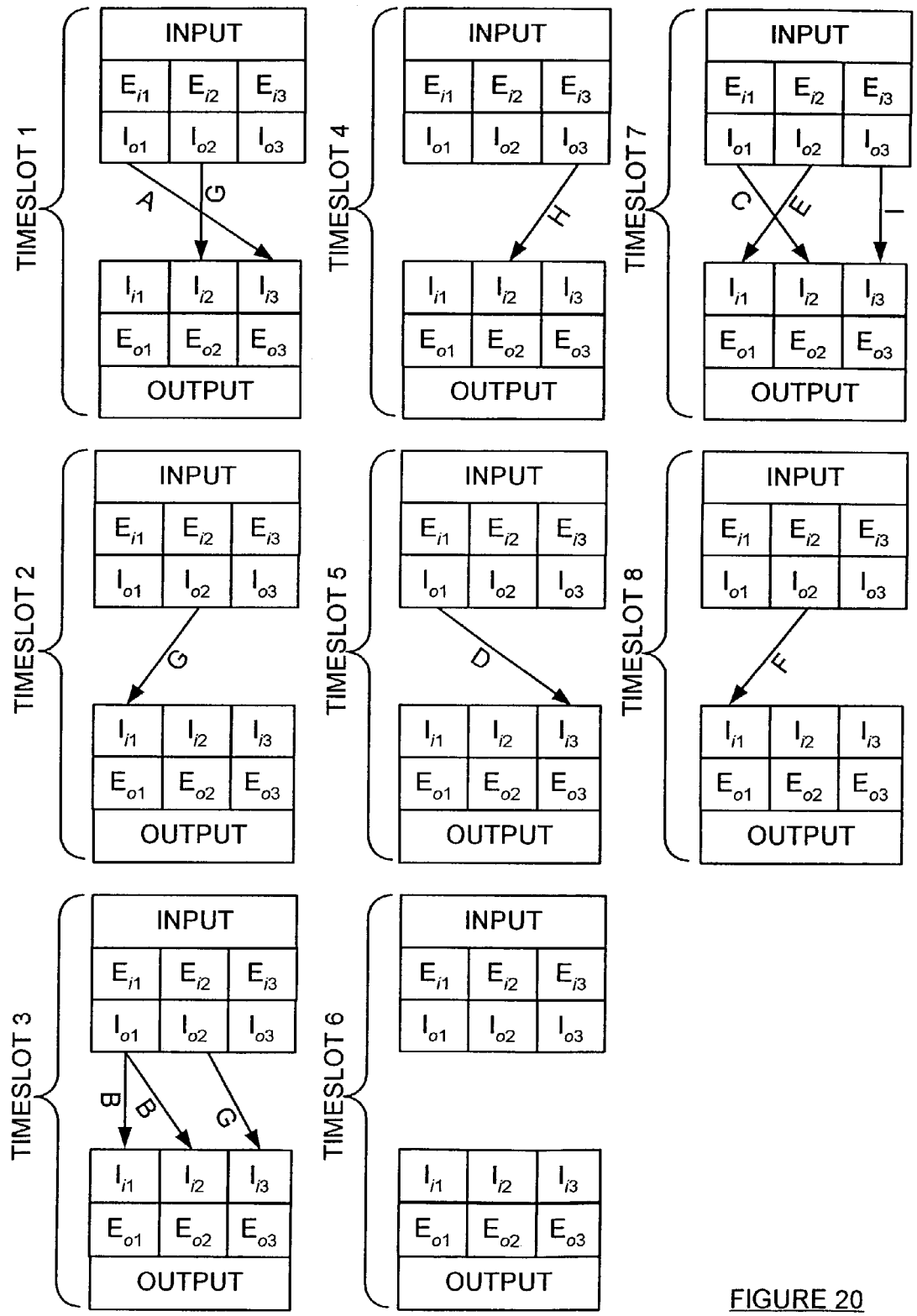
FIG. 20 is a timeslot data structure depicting the connection scheduling state of each timeslot of the FIG. 16 fabric.

FIG. 20 depicts a complete timeslot data structure corresponding to the FIG. 16 fabric. The FIG. 20 timeslot data structure has $m_1=m_2=8$ entries—one for each of the 8 egress/ingress internal timeslots. Each entry requires $2n=6$ counters (or sub-entries), namely one per external port. Each counter has a maximum value $i_s=p/n=3/3=1$ (or each sub-entry has $i_t$ sub-sub-entries). Such a timeslot data structure represents the FIG. 16 fabric's capacity to schedule $n\cdot m=3\cdot 4=12$ unicast calls between external input ports $E_{i1}$, $E_{i2}$, $E_{i3}$ and external output ports $E_{o1}$, $E_{o2}$, $E_{o3}$.

Figure 1A:
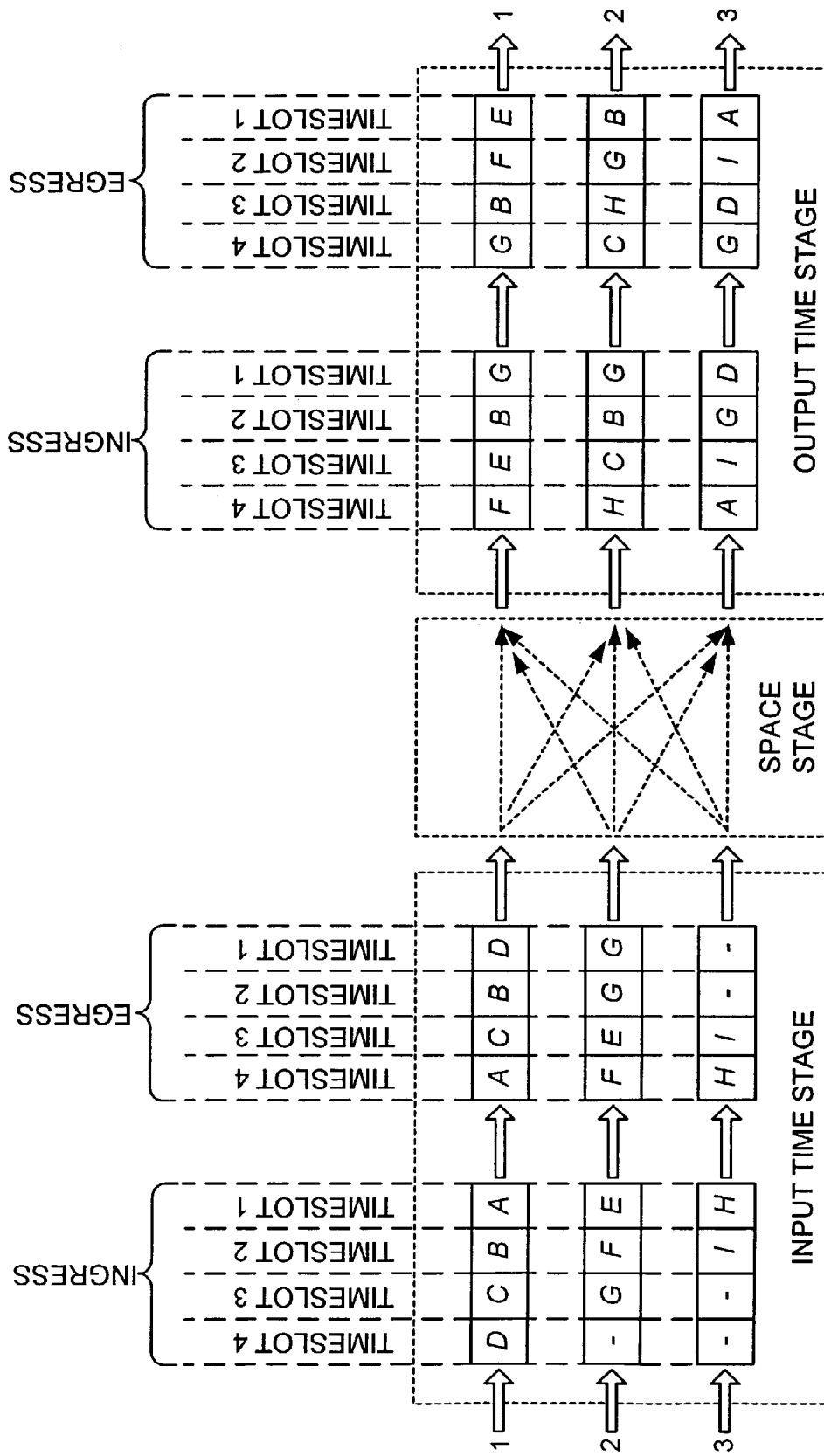
FIG. 1A schematically depicts a prior art TST switching fabric having n=3 ports and m=4 timeslots.
Figure 1B:
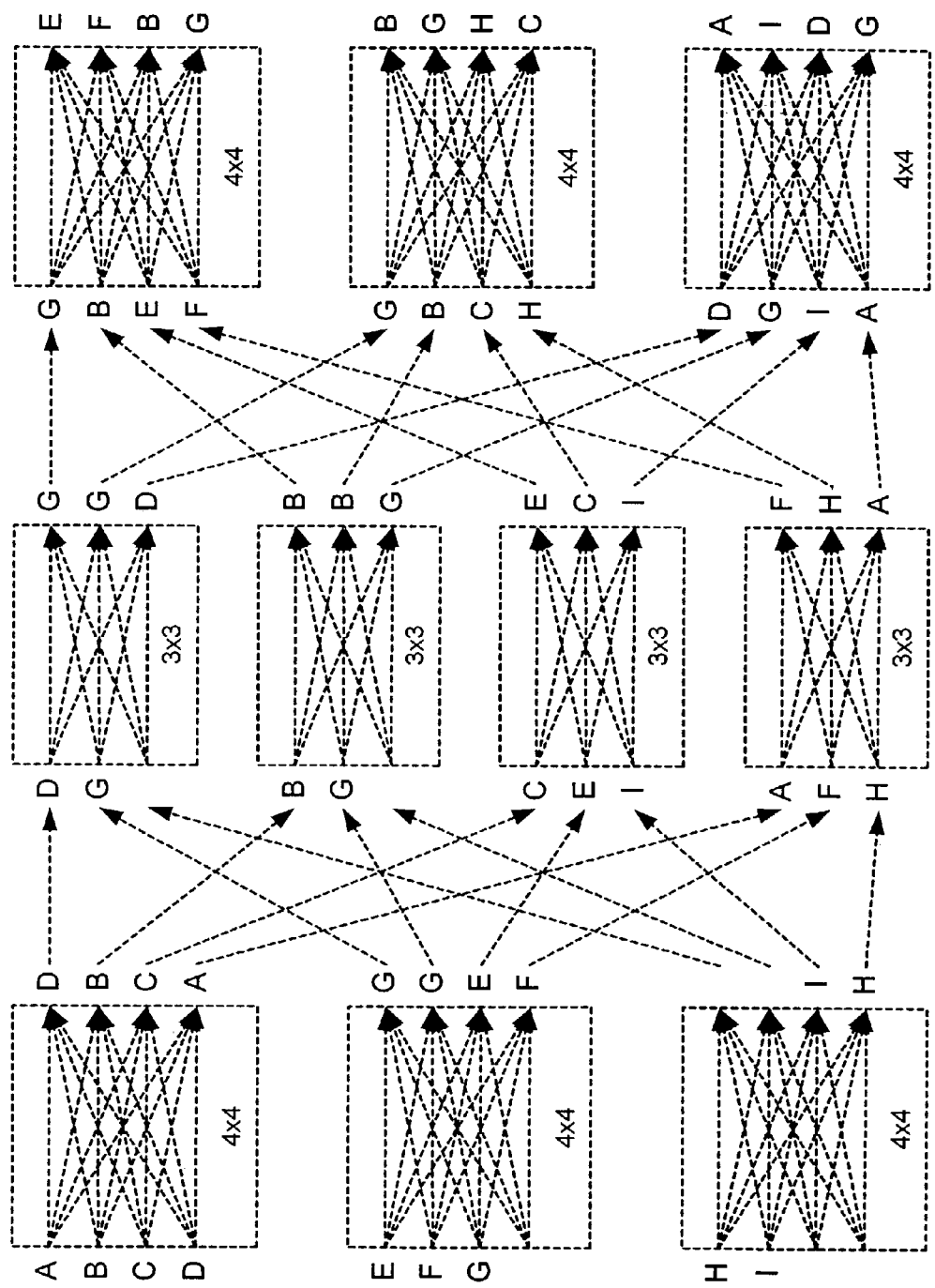
FIG. 1B schematically depicts a Clos Network equivalent to the FIG. 1A TST switching fabric.
Figure 1C:
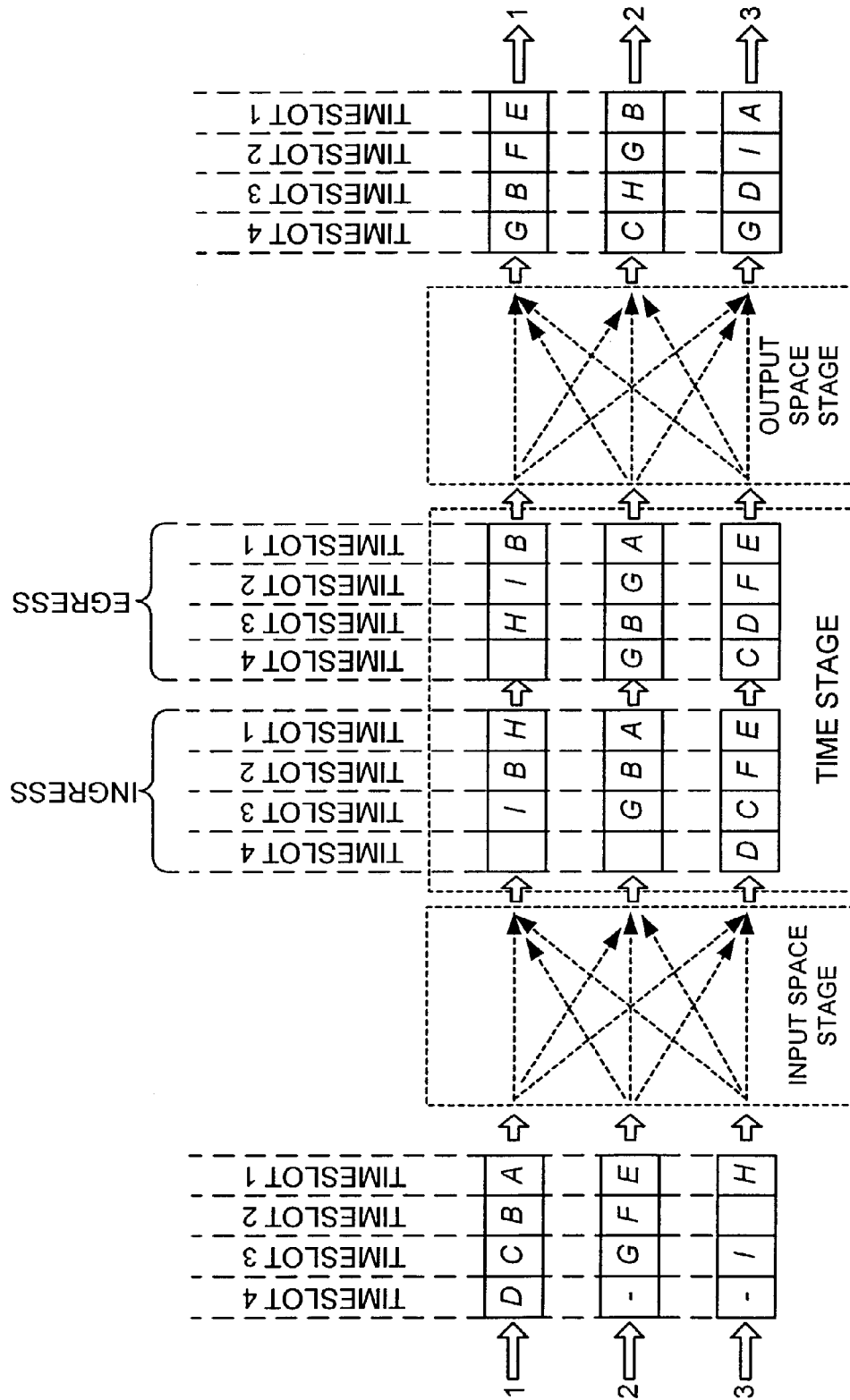
FIG. 1C schematically depicts an STS switching fabric similar to the FIG. 1A TST switching fabric.
Figure 1D:
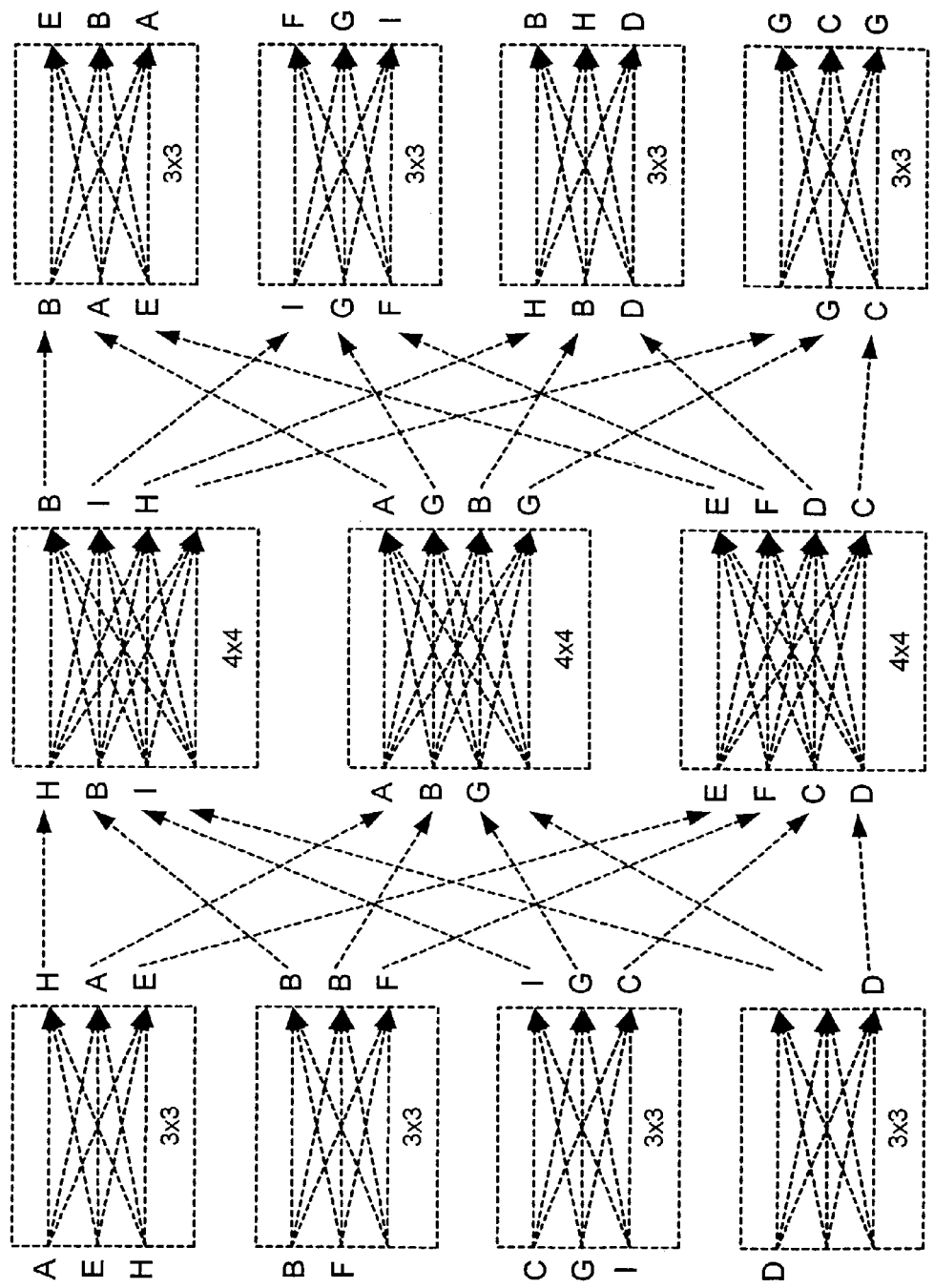
FIG. 1D schematically depicts a Clos Network equivalent to the FIG. 1C STS switching fabric.

The FIG. 1A fabric can also schedule $n\cdot m=3\cdot 4=12$ unicast calls between that fabric's external input and output ports. But, the FIG. 1A fabric lacks the previously-explained enhanced switching capabilities of the FIG. 16 and FIG. 17 fabrics. That enhanced capability is represented by each fabric's speedup factor $s=i_t\cdot i_s$. Recall that $s=1$ for the FIG. 1A fabric and $s=2$ for each of the FIGS. 16 and 17 fabrics. Although the FIGS. 16 and 17 fabrics have the same speedup (i.e. $s=2$) persons skilled in the art will understand that increasing a fabric's space stage speedup factor $i_s=p/n$ by a selected multiple provides more switching capacity than increasing the same fabric's time stage speedup factor $i_t=m_2/m$ by the same multiple. This is revealed by a comparison of FIGS. 1A, 16 and 17. The FIG. 1A fabric space stage's internal ports provide $p\cdot p=3\cdot 3=9$ switching paths for each of $m_1=m_2=4$ timeslots, yielding $9\cdot 4=36$ switching paths overall. The FIG. 16 fabric space stage's internal ports also provide $p\cdot p=3\cdot 3=9$ switching paths, but for each of $m_1=m_2=8$ timeslots, yielding $9\cdot 8=72$ switching paths overall. The FIG. 17 fabric space stage's internal ports provide $p\cdot p=6\cdot 6=36$ switching paths, for each of $m_1=m_2=4$ timeslots, yielding $36\cdot 4=144$ switching paths overall.

Different speedup ratios can be achieved by increasing the number of internal ports or by varying the number of internal timeslots while changing the number of internal ports. For example, if the number of internal ports in the FIG. 1A switch is doubled from $p=3$ to $p=6$, and if the number of internal timeslots is reduced from $m_2=4$ to $m_2=3$) then 1.5-times overall speedup is achieved since four external timeslots are effectively expanded to six internal timeslots (i.e. three timeslots per internal port, with two internal ports per external port). More particularly, $s=i_t\cdot i_s=m_2/m\cdot p/n=3/4\cdot 6/3=1.5$ The external aspect of an N-cast call $X:(y\rightarrow z_1, z_2 \ldots z_N)$ is represented in the timeslot data structure by associating a $y^{th}$ one of the first n sub-entries within a selected entry with $z_1, z_2, \ldots z_N$ ones of the second n sub-entries within the selected entry, where $y\leq n$. The internal aspect of the call is represented by associating one of the $y^{th}$ sub-entry's sub-sub-entries with a sub-sub-entry in each one of the $z_1, z_2, \ldots z_N$ ones of the second n sub-entries. For example, call A depicted in FIG. 18 is a unicast call having $y=E_{i1}$ and $z_1=E_{o3}$ (there are no $Z_2 \ldots z_N$ values since call A is unicast). Call A is represented by assigning the binary value "1" to the sub-sub-entry corresponding to internal output port $I_{o2}$ and also to the sub-sub-entry corresponding to internal input port $I_{i6}$. The binary value "0" is assigned to the sub-sub-entry corresponding to internal output port $I_{o1}$ to represent the fact that no call is scheduled on that port, again indicating that the fabric has the capacity to schedule one more call on external input port $E_{i1}$. As another example, call G depicted in FIG. 19 is a 3-cast call having $y=E_{i2}$, $z_1=E_{o1}$, $z_2=E_{o2}$ and $z_3=E_{o3}$. Call G is represented by assigning the binary value "1" to the sub-sub-entry corresponding to internal output port 14 and also to the sub-sub-entries corresponding to each of internal input ports $I_{i1}$, $I_{i3}$ and $I_{i5}$.

A 32-port switch, each port having 20 Gbps (gigabits per second) throughput capability, has an aggregate throughput capability of 640 Gbps. Well known simulation techniques can be applied to demonstrate the results attainable with the aid of the invention for such a switch. In the simulation, each one of the 32 ports carries a repeating grain group of 384 grains, as in the case of a SONET STS-384 switch. Two architectures similar to those of FIGS. 16 and 17 were simulated.

In the first simulation, only the number of timeslots was increased to achieve speedup, as previously explained in relation to FIG. 16 and as depicted in Table 1. Table 1 thus represents fabrics with no space stage speedup (i.e. the space stage speedup factor, $i_s$, has a constant value $i_s=1$) and having time stage speedup factors, $i_t$, which range over the values 1.0, 1.25, 1.5, 1.75 and 2.0.

In the second simulation, the number of ports was doubled and the number of timeslots was then varied to achieve speedup, as previously described in relation to FIG. 17. Table 2 thus represents fabrics with 2-times space stage speedup (i.e. the space stage speedup factor, $i_s$, has a constant value $i_s=2$) and having time stage speedup factors, $i_t$, which range over the values 0.5, 0.625, 0.75, 0.875 and 1.0.

TABLE 1

| Switch model with increased internal timeslots only ($i_s = 1$) | | | | |
|---|---|---|---|---|
| Speedup: $s = i_t \cdot i_s = i_t \cdot 1$ | External Ports | Internal Ports | External Timeslots | Internal Timeslots |
| 1 | 32 | 32 | 384 | 384 |
| 1.25 | 32 | 32 | 384 | 480 |
| 1.5 | 32 | 32 | 384 | 576 |
| 1.75 | 32 | 32 | 384 | 672 |
| 2 | 32 | 32 | 384 | 768 |

TABLE 2

Switch model with doubled internal ports ($i_s = 2$)

| Speedup: $s = i_t \cdot i_s = i_t \cdot 2$ | External Ports | Internal Ports | External Timeslots | Internal Timeslots |
|---|---|---|---|---|
| 1 | 32 | 64 | 384 | 192 |
| 1.25 | 32 | 64 | 384 | 240 |
| 1.5 | 32 | 64 | 384 | 288 |
| 1.75 | 32 | 64 | 384 | 336 |
| 2 | 32 | 64 | 384 | 384 |

Simulation results reveal the invention's efficacy in a number of variations. Table 3 below represents a simulation in which random 100% loads were generated and scheduled in accordance with the invention on a 640 Gbps Table 1 type fabric with 1.5 times speedup. A "free timeslot" is a rough measure of latent capacity, since any free timeslot can accept any new call. As long as free timeslots remain at the end of scheduling, any new call can be scheduled. The "duplicated calls" column provides a rough measure of the difficulty of scheduling the load, since calls are only duplicated and broken into smaller calls as the fabric becomes congested. The number of "blocked calls" is the number of calls that could not be scheduled by any means. The "first block" column represents fabric loading as a percentage when the first call is blocked.

TABLE 3

Typical Behavior for 1.5 Speedup 640 Gbps Fabric

| Call Width | Free Timeslots | Duplicated Calls | Blocked Calls | First Block |
|---|---|---|---|---|
| 1 | 175 | 0 | 0 | |
| 2 | 140 | 0 | 0 | |
| 3 | 121 | 0 | 0 | |
| 4 | 75 | 0 | 0 | |

Figure 4:
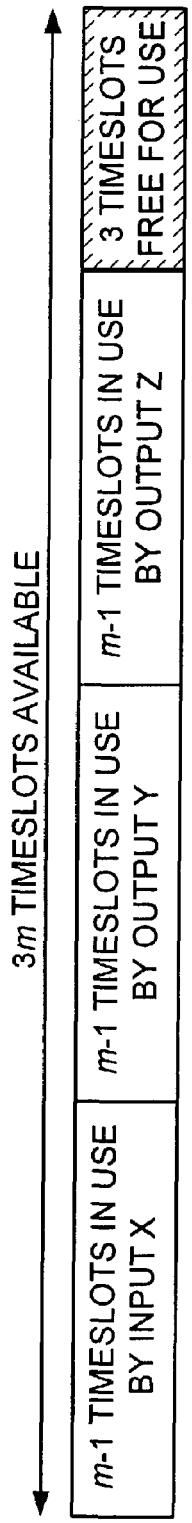
FIG. 4 depicts a worst case 2-cast scheduling scenario for 3m non-overlapped timeslots, with m−1 timeslots in use by input x, m−1 timeslots in use by output y and m−1 timeslots in use by output z, leaving 3 timeslots free for scheduling.
Figure 5:
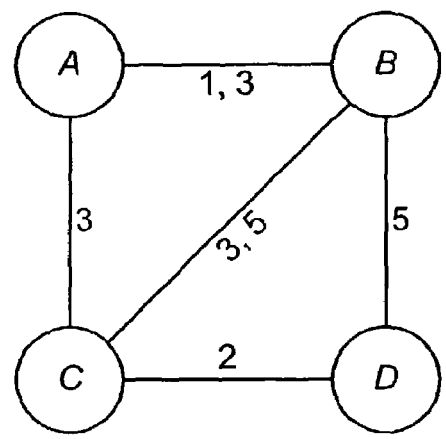
FIG. 5 is a multicast resource graph for the set of connection requests A:(1→3, 4), B:(1→3, 5), C:(2→3, 5), and D:(2→5).
Figure 6:
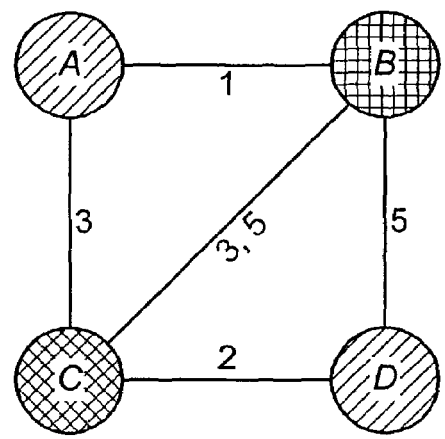
FIG. 6 is a 3-colored version of the FIG. 5 graph.
Figure 7:
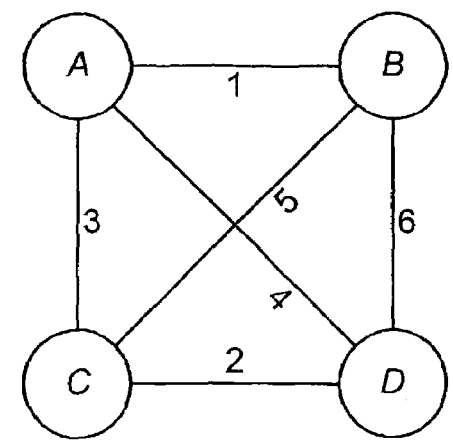
FIG. 7 is a multicast resource graph for the set of connection requests A:(1→3, 4), B:(1→5, 6), C:(2→3, 5), and D:(2→4, 6).

Table 3 reveals that randomly generated loads present little scheduling difficulty, even though 5-times speedup is potentially required for 4-cast loads, assuming that the above discussion relating to FIG. 4 correctly predicts the worst case 4-cast load. Randomly generated loads typically do not present the scheduling difficulties encountered in attempting to schedule artificial, non-random loads specifically formulated to present scheduling difficulties.

Table 4 represents the invention's handling of loads formulated for the maximal clique constructions discussed above for a 640 Gbps Table 1 type fabric using the increased-timeslots speedup technique. As can be seen, these loads present significantly greater challenges than the randomly constructed Table 3 loads and represent the worst case loading presently known to the inventor.

TABLE 4

Worst Case Behavior for 1.5 Speedup 640 Gbps Fabric

| Call Width | Free Timeslots | Duplicated Calls | Blocked Calls | First Block |
|---|---|---|---|---|
| 1 | 175 | 0 | 0 | |
| 2 | 0 | 576 | 0 | |
| 3 | 0 | 1088 | 64 | 83% |
| 4 | 0 | 1378 | 158 | 89% |

As can be seen, the 2-cast case requires input port replication for scheduling, while the 3-cast and 4-cast cases suffer blocked calls. Contrast this to Table 5, which again depicts a simulation of the invention's worst case behavior, but this time for a 640 Gbps Table 2 type fabric with doubled internal ports. The wider space stage provides increased ability to handle the difficult loads.

TABLE 5

Worst Case Behavior: 1.5-times Speedup 640 Gbps Fabric With Port Speedup Optimization

| Call Width | Free Timeslots | Duplicated Calls | Blocked Calls | First Block |
|---|---|---|---|---|
| 1 | 175 | 0 | 0 | |
| 2 | 96 | 0 | 0 | |
| 3 | 0 | 96 | 0 | |
| 4 | 0 | 74 | 23 | 97% |

Tables 6 and 7 reveal the value of randomizing and using the invention's port speedup optimization method in worst case 2-cast speedup implementations of the invention.

TABLE 6

Worst Case 2-cast and speedup:
Doubled Internal Ports, Deterministic Call Ordering

| Speedup | Free Timeslots | Duplicated Calls | Blocked Calls | First Block |
|---|---|---|---|---|
| 1 | 0 | 0 | 384 | 50% |
| 1.25 | 0 | 96 | 192 | 75% |
| 1.5 | 0 | 192 | 0 | |
| 1.75 | 0 | 96 | 0 | |
| 2 | 0 | 0 | 0 | |

TABLE 7

Worst Case 2-cast and speedup:
Doubled Internal Ports, Random Call Ordering

| Speedup | Free Timeslots | Duplicated Calls | Blocked Calls | First Block |
|---|---|---|---|---|
| 1 | 0 | 76 | 76 | 90% |
| 1.25 | 8 | 0 | 0 | |
| 1.5 | 47 | 0 | 0 | |
| 1.75 | 98 | 0 | 0 | |
| 2 | 150 | 0 | 0 | |

As can be seen, the multiple paths made available by the wider space stage architecture results in greater scheduling success rates at reduced speedup with free scheduling capacity remaining, in contrast to the architecture in which speedup is achieved by simply adding timeslots.

Tables 8 and 9 reveal similar results for 3-cast and 4-cast port speedup, random call ordering situations. 3-cast and 4-cast calls are routed successfully with 1.5-times speedup. 2-times speedup results in a significant number of free timeslots, even for 3-cast and 4-cast.

TABLE 8

Worst Case 3-cast and speedup:
Doubled Internal Ports, Random Call Ordering

| Speedup | Free Timeslots | Duplicated Calls | Blocked Calls | First Block |
|---|---|---|---|---|
| 1 | 0 | 225 | 233 | 78% |
| 1.25 | 0 | 271 | 5 | 98% |

TABLE 8-continued

Worst Case 3-cast and speedup:
Doubled Internal Ports, Random Call Ordering

| Speedup | Free Timeslots | Duplicated Calls | Blocked Calls | First Block |
|---------|----------------|------------------|---------------|-------------|
| 1.5     | 0              | 94               | 0             |             |
| 1.75    | 20             | 0                | 0             |             |
| 2       | 69             | 0                | 0             |             |

TABLE 9

Worst Case 4-cast and speedup:
Doubled Internal Ports, Random Call Ordering

| Speedup | Free Timeslots | Duplicated Calls | Blocked Calls | First Block |
|---------|----------------|------------------|---------------|-------------|
| 1       | 0              | 221              | 333           | 77%         |
| 1.25    | 0              | 286              | 40            | 96%         |
| 1.5     | 0              | 31               | 0             |             |
| 1.75    | 35             | 0                | 0             |             |
| 2       | 88             | 0                | 0             |             |

It is also useful to allow multiple "inverse multicast" inputs for a call. Although a call can have only one active input at a time, calls are often "protected" by providing secondary or protection inputs in case the signal from the primary or working input degrades. Inverse multicast calls are scheduled similarly to regular multicast calls, with the additional constraint that all of an inverse multicast call's inputs must be available in a particular timeslot before any of that call's outputs can be scheduled for that timeslot. The advantage of inverse multicast is that switchover from a primary to a secondary signal requires only a change of a space stage connection. This is important, since tight time constraints govern reestablishment of calls through secondary signals in protection switchover situations. Recalculation and rearrangement is not possible in such situations.

Table 10 presents the results of a simulation in which random 100% loads were generated and scheduled in accordance with the invention on a 640 Gbps fabric with randomized call order and doubled internal ports. One "free timeslot" in Table 10 corresponds to the capacity of two "free timeslots" in Table 3. Table 10 reveals improved performance over Table 3 for each call width. Table 10 also reveals the additional capacity provided by call duplication, since although there are no free timeslots in the worst of 1000 runs for multicast calls of width greater than 9, there are no blocked calls.

TABLE 10

Typical Behavior for 640 Gbps Fabric;
Doubled Internal Ports, Random Call Ordering

| Call Width | Free Timeslots | Duplicated Calls | Blocked Calls | First Block |
|------------|----------------|------------------|---------------|-------------|
| 1          | 90             | 0                | 0             |             |
| 2          | 78             | 0                | 0             |             |
| 3          | 68             | 0                | 0             |             |
| 4          | 56             | 0                | 0             |             |
| 5          | 45             | 0                | 0             |             |
| 6          | 33             | 0                | 0             |             |
| 7          | 21             | 0                | 0             |             |
| 8          | 11             | 0                | 0             |             |
| 9          | 0              | 0                | 0             |             |
| 10         | 0              | 29               | 0             |             |

TABLE 10-continued

Typical Behavior for 640 Gbps Fabric;
Doubled Internal Ports, Random Call Ordering

| Call Width | Free Timeslots | Duplicated Calls | Blocked Calls | First Block |
|------------|----------------|------------------|---------------|-------------|
| 11         | 0              | 40               | 0             |             |
| 12         | 0              | 75               | 0             |             |

Table 11 represents the same simulation as Table 10, but with the switching fabric handling inverse multicast, where the number of input ports equals the number of output ports. Although this may be unrealistic in the sense that it is unlikely that an inverse multicast call would have more than 2 inputs (i.e. working and protect inputs) it is helpful to note that performance degrades as call width increases. Simple analysis implies that these calls should be twice as difficult to schedule as calls having only one input. The invention does slightly worse than twice as bad: a call width of 4 with inverse multicast is roughly equivalent to a call width of 7 without inverse multicast; a call width of 5 with inverse multicast is roughly equivalent to a call width of 9 without inverse multicast. The increased difficulty of scheduling inverse multicast is due to the requirement that all inputs must be free before a call can be scheduled. As the number of inputs increases, the possibility of successfully dividing the call is reduced.

TABLE 11

Typical Behavior for 640 Gbps Fabric;
Doubled Internal Ports, Random Call Ordering
With Inverse Multicast

| Call Width | Free Timeslots | Duplicated Calls | Blocked Calls | First Block |
|------------|----------------|------------------|---------------|-------------|
| 1          | 89             | 0                | 0             |             |
| 2          | 67             | 0                | 0             |             |
| 3          | 44             | 0                | 0             |             |
| 4          | 20             | 0                | 0             |             |
| 5          | 0              | 10               | 1             | 99%         |
| 6          | 0              | 88               | 47            | 93%         |
| 7          | 0              | 103              | 109           | 87%         |
| 8          | 0              | 104              | 148           | 83%         |
| 9          | 0              | 94               | 174           | 80%         |
| 10         | 0              | 91               | 188           | 77%         |
| 11         | 0              | 83               | 199           | 76%         |
| 12         | 0              | 46               | 187           | 77%         |

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A multicast call scheduling method for a TST switch fabric having n input ports, n output ports, and a p-port space stage coupled between an m-timeslot input time stage and an m-timeslot output time stage, the input time stage having $m_1 = m$ ingress timeslots and $m_2$ egress timeslots, the output time stage having $m_2$ ingress timeslots and $m_1 = m$ egress timeslots, the fabric having a speedup factor $s = i_t \cdot i_s$ where $i_t = m_2/m$ and $i_s = p/n$, the method comprising:

(a) forming a timeslot data structure having $m_2$ entries, each entry corresponding to a pair consisting of one input time stage egress timeslot and one output time stage ingress timeslot, each entry having 2n sub-entries, the first n sub-entries corresponding to the n input ports and the second n sub-entries corresponding to the n output ports, each sub-entry having is sub-sub-entries, each sub-sub-entry corresponding to one of the p space stage ports, wherein an N-cast call $X:(y \rightarrow z_1, z_2 \ldots z_N)$ from a $y^{th}$ one of the n input ports to $z_1, z_2 \ldots z_N$ ones of the n output ports is represented in the timeslot data structure by:

(i) associating a $y^{th}$ one of the first n sub-entries within a selected entry with $z_1, z_2, \ldots z_N$ ones of the second n sub-entries within the selected entry;
  (ii) associating a sub-sub-entry of the $y^{th}$ one of the first n sub-entries with a sub-sub-entry in every one of the $z_1, z_2, \ldots z_N$ ones of the second n sub-entries within the selected entry;

(b) initially assigning an initialization value to each sub-sub-entry within each sub-entry within each entry, the initialization value representing scheduling of no calls on the space stage port corresponding to that sub-sub-entry in the timeslot corresponding to that entry;

(c) upon receipt of an N-cast call $X:(y \rightarrow z_1, z_2, \ldots z_N)$ to be scheduled on the switch fabric, sequentially examining the timeslot data structure entries to determine if there is a first entry having a first property that the first entry has:

(i) a first sub-sub-entry containing the initialization value in the $y^{th}$ one of the first n sub-entries;
  (ii) N sub-sub-entries containing the initialization value in the $z_1, z_2, \ldots z_N$ ones of the second n sub-entries;

(d) if there is a first entry having the first property, scheduling the call $X:(y \rightarrow z_1, z_2 \ldots z_N)$ for transmission in the timeslot corresponding to the first entry having the first property and updating the timeslot data structure by assigning a non-initialization value to the first sub-sub-entry and to each of the N sub-sub-entries;

(e) if there is no first entry having the first property and if N=1, terminating the method by indicating that the call cannot be scheduled on the switch fabric; and, (f) if there is no first entry having the first property and if N>1, dividing the call into two or more calls.

2. A multicast call scheduling method for a TST switch fabric having n input ports, n output ports, and a p-port space stage coupled between an m-timeslot input time stage and an m-timeslot output time stage, the input time stage having $m_1 = m$ ingress timeslots and $m_2$ egress timeslots, the output time stage having $m_2$ ingress timeslots and $m_1 = m$ egress timeslots, the fabric having a speedup factor $s = i_t \cdot i_s$ where $i_1 = m_2/m$ and $i_s = p/n$, the method comprising:

(a) forming a timeslot data structure having $m_2$ entries, each entry corresponding to a pair consisting of one input time stage egress timeslot and one output time stage ingress timeslot, each entry having 2n sub-entries, the first n sub-entries corresponding to the n input ports and the second n sub-entries corresponding to the n output ports, each sub-entry having an associated counter for storing an integer value between 0 and $i_s$, each counter value corresponding to one of the p space stage ports, wherein an N-cast call $X:(y \rightarrow z_1, z_2 \ldots z_N)$ from a $y^{th}$ one of the n input ports to $z_1, z_2 \ldots z_N$ ones of the n output ports is represented in the timeslot data structure by:

(i) associating a $y^{th}$ one of the first n sub-entries within a selected entry with $z_1, z_2 \ldots z_N$ ones of the second n sub-entries within the selected entry;
  (ii) storing a predefined integer value in the counter of the $y^{th}$ one of the first n sub-entries;
  (iii) storing a predefined integer value in the counter of every one of the $z_1, z_2, \ldots z_N$ ones of the second n sub-entries within the selected entry;

(b) initially storing a zero value in each counter within each sub-entry within each entry, to represent scheduling of no calls on the space stage port corresponding to that counter in the timeslot corresponding to that entry;

(c) upon receipt of an N-cast call $X:(y \rightarrow z_1, z_2 \ldots z_N)$ to be scheduled on the switch fabric, sequentially examining the timeslot data structure entries to determine if there is a first entry having a first property that the first entry has:

(i) a first counter containing a value $<i_s$ in the $y^{th}$ one of the first n sub-entries;
  (ii) N counters each containing a value $<i_s$ in the $z_1, z_2, \ldots z_N$ ones of the second n sub-entries;

(d) if there is a first entry having the first property, scheduling the call $X:(y \rightarrow z_1, z_2 \ldots z_N)$ for transmission in the timeslot corresponding to the first entry having the first property and updating the timeslot data structure by incrementing the first counter and each one of the N counters;

(e) if there is no first entry having the first property and if N=1, terminating the method by indicating that the call cannot be scheduled on the switch fabric; and, (f) if there is no first entry having the first property and if N>1, dividing the call into two or more calls.

3. A method as defined in claim 1, said dividing the call into two or more calls further comprising:

(a) sequentially examining each timeslot data structure entry to determine whether the examined entry has a second property that:

(i) a sub-sub-entry in the $y^{th}$ one of the first n sub-entries contains the initialization value;
  (ii) at least one sub-sub-entry in the $z_1, z_2, \ldots z_N$ ones of the second n sub-entries contains the initialization value;

(b) forming a list of all candidate timeslot data structure entries having the second property, and including with each list entry an output-ports-satisfied indication of the number of sub-sub-entries in that list entry's second n sub-entries which contain the initialization value;

(c) ordering the list in descending sequence of each list entry's output-ports-satisfied indication;

(d) sequentially examining the ordered list entries to detect a combination of list entries having a third property that:

(i) each one of the combination of list entries contains the initialization value in a $y^{th}$ one of the first n sub-entries;
  (ii) each one of the combination of list entries contains the initialization value in at least one of the $z_1, z_2 \ldots z_N$ ones of the second n sub-entries;
  (iii) the combination of list entries contains the initialization value at least once in each $z_1, z_2 \ldots z_N$ one of the second n sub-entries;

(e) if a combination of entries having the third property is detected, scheduling the call $X:(y \rightarrow z_1, z_2 \ldots z_N)$ for transmission in the timeslots corresponding to the detected combination of list entries having the third property and updating the timeslot data structure by assigning the non-initialization value to:

(i) the $y^{th}$ one of the first n sub-entries in each one of the detected combination of list entries;
  (ii) each one of the $z_1, z_2 \ldots z_N$ ones of the second n sub-entries in the detected combination of list entries corresponding to those ones of the n output ports on which the call is scheduled for transmission; and, (f) if no combination of entries having the third property is detected, terminating the method by indicating that the call cannot be scheduled on the switch fabric.

4. A method as defined in claim 1, said dividing the call into two or more calls further comprising:

(a) sequentially examining each timeslot data structure entry to determine whether the examined entry has a second property that:

(i) a counter in the $y^{th}$ one of the first n sub-entries contains a value $<i_s$;

(ii) at least one counter in the $z_1, z_2, \ldots z_N$ ones of the second n sub-entries contains a value $<i_s$;

(b) forming a list of all candidate timeslot data structure entries having the second property, and including with each list entry an output-ports-satisfied indication of the number of counters in that list entry's second n sub-entries which contain a value $<i_s$;

(c) ordering the list in descending sequence of each list entry's output-ports-satisfied indication;

(d) sequentially examining the ordered list entries to detect a combination of list entries having a third property that:

(i) each one of the combination of list entries contains a counter containing a value $<i_s$ in a $y^{th}$ one of the first n sub-entries;

(ii) each one of the combination of list entries contains a counter containing a value $<i_s$ in at least one of the $z_1, z_2 \ldots z_N$ ones of the second n sub-entries;

(iii) the combination of list entries contains a counter containing a value $<i_s$ at least once in each $z_1, z_2 \ldots z_N$ one of the second n sub-entries;

(e) if a combination of entries having the third property is detected, scheduling the call X:($y \rightarrow z_1, z_2 \ldots z_N$) for transmission in the timeslots corresponding to the detected combination of list entries having the third property and updating the timeslot data structure by incrementing:

(i) the counter in the $y^{th}$ one of the first n sub-entries in each one of the detected combination of list entries;

(ii) the counter in each one of the $z_1, z_2 \ldots z_N$ ones of the second n sub-entries in the detected combination of list entries corresponding to those ones of the n output ports on which the call is scheduled for transmission; and, (f) if no combination of entries having the third property is detected, terminating the method by indicating that the call cannot be scheduled on the switch fabric.

5. A method as defined in claim 3, further comprising, at regular intervals, rearranging all calls scheduled on the switch fabric.

6. A method as defined in claim 4, further comprising, at regular intervals, rearranging all calls scheduled on the switch fabric.

7. A method as defined in claim 3, further comprising maintaining a sequentially ordered list of the timeslots, and wherein said sequentially examining the timeslot data structure entries to determine if there is a first entry having the first property further comprises examining every entry in the sequentially ordered list of the timeslots in a predefined order commencing at a predefined position in the sequentially ordered list of the timeslots.

8. A method as defined in claim 4, further comprising maintaining a sequentially ordered list of the timeslots, and wherein said sequentially examining the timeslot data structure entries to determine if there is a first entry having the first property further comprises examining every entry in the sequentially ordered list of the timeslots in a predefined order commencing at a predefined position in the sequentially ordered list of the timeslots.

9. A method as defined in claim 3, further comprising maintaining a sequentially ordered list of the timeslots, and wherein said sequentially examining the timeslot data structure entries to determine if there is a first entry having the first property further comprises examining every entry in the sequentially ordered list of the timeslots once before re-examining any entry in the sequentially ordered list of the timeslots.

10. A method as defined in claim 4, further comprising maintaining a sequentially ordered list of the timeslots, and wherein said sequentially examining the timeslot data structure entries to determine if there is a first entry having the first property further comprises examining every entry in the sequentially ordered list of the timeslots once before re-examining any entry in the sequentially ordered list of the timeslots.

11. A method as defined in claim 3, further comprising maintaining a sequentially ordered list of the timeslots, and wherein said sequentially examining the timeslot data structure entries to determine if there is a first entry having the first property further comprises randomly searching the sequentially ordered list of the timeslots.

12. A method as defined in claim 4, further comprising maintaining a sequentially ordered list of the timeslots, and wherein said sequentially examining the timeslot data structure entries to determine if there is a first entry having the first property further comprises randomly searching the sequentially ordered list of the timeslots.

13. A method as defined in claim 1, wherein the initialization value is zero, and the non-initialization value is one.

14. A method as defined in claim 3, further comprising terminating, in response to a call termination request, a call scheduled in one or more previously allocated timeslots, said terminating further comprising:

(a) decrementing the sub-sub-entry in the $y^{th}$ one of the first n sub-entries corresponding to each one of said previously allocated timeslots; and, (b) decrementing the sub-sub-entries corresponding to the call's output ports in each of the $z_1, z_2, \ldots z_N$ ones of the second n sub-entries corresponding to each one of said previously allocated timeslots.

15. A method as defined in claim 4, further comprising terminating, in response to a call termination request, a call scheduled in one or more previously allocated timeslots, said terminating further comprising:

(a) decrementing the counter in the $y^{th}$ one of the first n sub-entries corresponding to each one of said previously allocated timeslots; and, (b) decrementing the counters corresponding to the call's output ports in each of the $z_1, z_2, \ldots z_N$ ones of the second n sub-entries corresponding to each one of said previously allocated timeslots.

16. A method as defined in claim 5, wherein said rearranging further comprises removing all representations of a selected number of calls from the timeslot data structure, then repeating said updating of the timeslot data structure to re-represent each one of the selected number of calls in the timeslot data structure.

17. A method as defined in claim 6, wherein said rearranging further comprises removing all representations of a selected number of calls from the timeslot data structure, then repeating said updating of the timeslot data structure to re-represent each one of the selected number of calls in the timeslot data structure.

18. A method as defined in claim 16, wherein the selected number of calls further comprises calls previously divided into two or more calls.

19. A method as defined in claim 17, wherein the selected number of calls further comprises calls previously divided into two or more calls.

20. A method as defined in claim 16, wherein the selected number of calls further comprises calls scheduled in sequentially highest numbered timeslots.

21. A method as defined in claim 17, wherein the selected number of calls further comprises calls scheduled in sequentially highest numbered timeslots.

22. A method as defined in claim 16, wherein the selected number of calls are randomly chosen.

23. A method as defined in claim 17, wherein the selected number of calls are randomly chosen.

24. A method as defined in claim 1, further comprising, upon simultaneous receipt of a plurality of N-cast calls to be scheduled on the switch fabric:
  (a) randomly selecting an unscheduled one of the plurality of calls;
  (b) scheduling the randomly selected one of the plurality of calls in accordance with a sub-method comprising claim 1(c) through claim 1(f); and,
  (c) repeating the method commencing with claim 24(a) until all of the plurality of calls are scheduled.

25. A method as defined in claim 2, further comprising, upon simultaneous receipt of a plurality of N-cast calls to be scheduled on the switch fabric:
  (a) randomly selecting an unscheduled one of the plurality of calls;
  (b) scheduling the randomly selected one of the plurality of calls in accordance with a sub-method comprising claim 1(c) through claim 1(f); and,
  (c) repeating the method commencing with claim 25(a) until all of the plurality of calls are scheduled.

26. A method as defined in claim 1, further comprising, upon simultaneous receipt of a plurality of N-cast calls to be scheduled on the switch fabric:
  (a) selecting an unscheduled one of the plurality of calls by round-robin selection from a list of the plurality of calls sorted in ascending sequence of input port number assigned to each one of the plurality of calls;
  (b) scheduling the selected unscheduled one of the plurality of calls in accordance with a sub-method comprising claim 1(c) through claim 1(f); and,
  (c) repeating the method commencing with claim 26(a) until all of the plurality of calls are scheduled.

27. A method as defined in claim 2, further comprising, upon simultaneous receipt of a plurality of N-cast calls to be scheduled on the switch fabric:
  (a) selecting an unscheduled one of the plurality of calls by round-robin selection from a list of the plurality of calls sorted in ascending sequence of input port number assigned to each one of the plurality of calls;
  (b) scheduling the selected unscheduled one of the plurality of calls in accordance with a sub-method comprising claim 1(c) through claim 1(f); and,
  (c) repeating the method commencing with claim 27(a) until all of the plurality of calls are scheduled.

* * * * *